(12) United States Patent
Kim et al.

(10) Patent No.: US 9,528,732 B2
(45) Date of Patent: Dec. 27, 2016

(54) HEAT PUMP APPARATUS

(71) Applicant: SAMSUNG ELECTRONICS CO., LTD., Suwon-si, Gyeonggi-do (KR)

(72) Inventors: Sung Goo Kim, Hwaseong (KR); Hyo Ju Moon, Suwon (KR); Jong Youb Kim, Suwon (KR); Jae Hyuk Oh, Seongnam (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 439 days.

(21) Appl. No.: 14/062,156

(22) Filed: Oct. 24, 2013

(65) Prior Publication Data

US 2014/0116072 A1   May 1, 2014

(30) Foreign Application Priority Data

Oct. 29, 2012 (KR) .................... 10-2012-0120165

(51) Int. Cl.
F25B 7/00 (2006.01)
F25B 39/04 (2006.01)
(Continued)

(52) U.S. Cl.
CPC ............. *F25B 30/02* (2013.01); *F24D 3/18* (2013.01); *F24D 17/001* (2013.01); *F24D 17/02* (2013.01);
(Continued)

(58) Field of Classification Search
CPC ............. F25B 30/02; F25B 7/00; F25B 13/00; F25B 25/005; F25B 2313/009; F25B 2313/02732; F25B 2313/02743; F25B 2313/0292; F25B 2339/047; F24D 3/18; F24D 17/001; F24D 17/02; F24D 19/1072; F24D 2200/31; Y02B 30/12; Y02B 30/52
(Continued)

(56) References Cited

U.S. PATENT DOCUMENTS

| 4,646,538 A * | 3/1987 | Blackshaw et al. ......... 62/238.7 |
| 2005/0066678 A1* | 3/2005 | Kamimura ................... 62/238.7 |

(Continued)

FOREIGN PATENT DOCUMENTS

| EP | 1780476 A1 | 5/2007 |
| EP | 2333457 A2 | 6/2011 |

(Continued)

OTHER PUBLICATIONS

Extended European Search Report mailed Feb. 28, 2014 in related European Application No. 13190429.4.

*Primary Examiner* — Ryan J Walters
*Assistant Examiner* — Joseph Trpisovsky
(74) *Attorney, Agent, or Firm* — Staas & Halsey LLP

(57) ABSTRACT

A heat pump apparatus is provided. The heat pump raises the water temperature during a hot-water supply without using a separate heat source such as a heater. The heat pump apparatus includes an outdoor unit including a first compressor, a first heat exchanger, and a first expansion valve. The heat pump apparatus includes an indoor unit including a second heat exchanger and a second expansion valve, a hydro unit including a second compressor, a third heat exchanger, a fourth heat exchanger, a fifth heat exchanger, a third expansion valve, a fourth expansion valve, and a fifth expansion valve. The heat pump apparatus includes a refrigerant flow path switching unit to switch among flow paths, and a water flow path switching unit to switch between flow paths of the water.

20 Claims, 16 Drawing Sheets

(51) Int. Cl.
*F25B 27/00* (2006.01)
*F25B 30/02* (2006.01)
*F25B 13/00* (2006.01)
*F25B 25/00* (2006.01)
*F24D 3/18* (2006.01)
*F24D 17/00* (2006.01)
*F24D 17/02* (2006.01)
*F24D 19/10* (2006.01)

(52) U.S. Cl.
CPC ............. *F24D 19/1072* (2013.01); *F25B 7/00* (2013.01); *F25B 13/00* (2013.01); *F25B 25/005* (2013.01); *F24D 2200/31* (2013.01); *F25B 2313/009* (2013.01); *F25B 2313/0292* (2013.01); *F25B 2313/02732* (2013.01); *F25B 2313/02743* (2013.01); *F25B 2339/047* (2013.01); *Y02B 30/52* (2013.01)

(58) Field of Classification Search
USPC .................... 62/79, 175, 335, 177–181, 183, 184,62/238.6, 238.7, 506
See application file for complete search history.

(56) References Cited

U.S. PATENT DOCUMENTS

| | | | |
|---|---|---|---|
| 2010/0050675 A1* | 3/2010 | Kameyama et al. | 62/238.7 |
| 2010/0319376 A1* | 12/2010 | Kawano et al. | 62/238.6 |
| 2012/0152514 A1* | 6/2012 | Takasaki et al. | 165/241 |

FOREIGN PATENT DOCUMENTS

| | | | |
|---|---|---|---|
| EP | 2363663 | A1 | 9/2011 |
| EP | 2381180 | A2 | 10/2011 |

\* cited by examiner

* HHR HEATING: AIR-TO-WATER HEATING > AIR-TO-AIR COOLING

* HR COOLING: AIR-TO-AIR COOLING > AIR-TO-WATER HEATING

* HR COOLING: AIR-TO-WATER COOLING > AIR-TO-AIR HEATING

* AIR-TO-AIR HEATING + AIR-TO-WATER HEATING

* AIR-TO-AIR HEATING + AIR-TO-WATER HEATING

* AIR-TO-AIR HEATING

* HR HEATING: AIR-TO-WATER HEATING > AIR-TO-AIR COOLING

HEAT PUMP APPARATUS

CROSS-REFERENCE TO RELATED APPLICATIONS

This application is related to, and claims priority to, Korean Patent Application No. 10-2012-0120165 filed on Oct. 29, 2012, in the Korean Intellectual Property Office, the disclosure of which is incorporated herein by reference in its entirety.

BACKGROUND

1. Field

Embodiments of the present invention relate to a heat pump apparatus having a combination of an outdoor unit, an indoor unit, and a hydro unit.

2. Description of the Related Art

A heat pump is an apparatus to transport heat transferred from a high-temperature site to a low temperature site in a reverse direction by absorbing heat from the low-temperature site and providing the absorbed heat to the high-temperature site. The heat pump uses the heat produced and recovered during the refrigeration cycle involving compression, condensation and evaporation of the refrigerant to perform cooling and heating (air-to-air mode), and hot-water supply (air-to-water mode).

In such a heat pump, a maximum temperature to which the water may be heated during the operation of hot-water supply (air-to-water mode) may be limited to be equal to, or lower than, about 50° C., which is the temperature for heating (air-to-air mode).

A separate heater may be needed to increase water temperature, and accordingly installation expenses and operation cost may increase.

SUMMARY

It is an aspect of the present invention to provide a heat pump apparatus that raises the water temperature, for example, above 50° C. during hot-water supply (air-to-water mode), without using a separate heat source such as a heater.

It is an aspect of the present invention to provide a heat pump apparatus that supplies water at various temperatures.

Additional aspects of the invention will be set forth in part in the description that follows and, in part, will be obvious from the description, or may be learned by practice of the invention.

In accordance with an aspect of the present invention, a heat pump apparatus includes an outdoor unit including a first compressor to compress a first refrigerant, a first heat exchanger to cause heat exchange to occur between the first refrigerant and outdoor air, and a first expansion valve to expand the first refrigerant, an indoor unit including a second heat exchanger to cause heat exchange to occur between the first refrigerant and indoor air, and a second expansion valve to expand the first refrigerant, a hydro unit including a second compressor to compress a second refrigerant, a third heat exchanger to cause heat exchange to occur between the first refrigerant and the second refrigerant, a fourth heat exchanger to cause heat exchange to occur between the first refrigerant and water, a fifth heat exchanger to cause heat exchange to occur between the second refrigerant and water, a third expansion valve and a fourth expansion valve to expand the first refrigerant, and a fifth expansion valve to expand the second refrigerant, a refrigerant flow path switching unit to switch among flow paths of the first refrigerant between the first compressor and the first heat exchanger, between the first compressor and the second heat exchanger, between the first compressor and the third heat exchanger, and between the first compressor and the fourth heat exchanger, and a water flow path switching unit to switch between flow paths of the water to allow the water to flow to one of the fourth heat exchanger and the fifth heat exchanger.

The refrigerant flow path switching unit may include a first flow path switching valve disposed between the first compressor and the first heat exchanger to allow the first refrigerant discharged from an outlet port of the first compressor to flow to the first heat exchanger or to allow the first refrigerant having passed through the first heat exchanger to be introduced into an inlet port of the first compressor, a second flow path switching valve disposed between the first compressor and the second heat exchanger to allow the first refrigerant discharged from the outlet port of the first compressor to flow to the second heat exchanger or to allow the first refrigerant having passed through the second heat exchanger to be introduced into the inlet port of the first compressor, a third flow path switching valve disposed between the first compressor and the third heat exchanger to allow the first refrigerant discharged from the outlet port of the first compressor to flow to the third heat exchanger or to allow the first refrigerant having passed through the third heat exchanger to be introduced into the inlet port of the first compressor, and a fourth flow path switching valve to allow the first refrigerant having passed through the third flow path switching valve to flow to one of the fourth heat exchanger and the third heat exchanger.

The water flow path switching unit may be a three-way valve.

In a high-temperature water production mode, the fourth flow path switching valve may perform flow path switching to allow the first refrigerant to flow to the third heat exchanger, the fifth flow path switching valve may perform flow path switching to allow the water to flow to the fifth heat exchanger, and the second refrigerant compressed in the second compressor may be condensed in the fifth heat exchanger to exchange heat with the water, and evaporates in the third heat exchanger to exchange heat with the first refrigerant.

The third expansion valve may be open to allow the first refrigerant having passed through the third heat exchanger to flow to the first heat exchanger or the second heat exchanger, and the fourth expansion valve may be closed to prevent the first refrigerant having passed through the third heat exchanger from flowing to the fourth heat exchanger.

In a middle-temperature water production mode, the fourth flow path switching valve may perform flow path switching to allow the first refrigerant to flow to the fourth heat exchanger, and the fifth flow path switching valve may be perform flow path switching to allow the water to flow to the fourth heat exchanger.

The third expansion valve may be closed to prevent the first refrigerant from flowing to the third heat exchanger, and the fourth expansion valve may be open to allow the first refrigerant compressed in the first compressor to flow to the fourth heat exchanger.

In a low-temperature water production mode, the fourth flow path switching valve may perform flow path switching to allow the first refrigerant evaporated in the fourth heat exchanger to flow to the inlet port of the first compressor, and the fifth flow path switching valve may perform flow path switching to allow the water to flow to the fourth heat exchanger.

The third expansion valve may be closed to prevent the first refrigerant from flowing to the third heat exchanger, and the fourth expansion valve may be open to allow the first refrigerant compressed in the first compressor to flow to the fourth heat exchanger.

In accordance with an aspect of the present invention, a heat pump apparatus includes a first compressor to compress the first refrigerant, a second compressor to compress the second refrigerant, a first heat exchanger to cause heat exchange to occur between the first refrigerant and outdoor air, a second heat exchanger to cause heat exchange to occur between the first refrigerant and indoor air, a third heat exchanger to cause heat exchange to occur between the first refrigerant and the second refrigerant, a fourth heat exchanger to cause heat exchange to occur between the first refrigerant and water, a fifth heat exchanger to cause heat exchange to occur between the second refrigerant and water, a first flow path switching valve disposed between the first compressor and the first heat exchanger to allow the first refrigerant discharged from an outlet port of the first compressor, to flow to the first heat exchanger or to allow the first refrigerant having passed through the first heat exchanger to be introduced into an inlet port of the first compressor, a second flow path switching valve disposed between the first compressor and the second heat exchanger to allow the first refrigerant discharged from the outlet port of the first compressor to flow to the second heat exchanger or to allow the first refrigerant having passed through the second heat exchanger to be introduced into the inlet port of the first compressor, a third flow path switching valve disposed between the first compressor and the third heat exchanger to allow the first refrigerant discharged from the outlet port of the first compressor to flow to the third heat exchanger or to allow the first refrigerant having passed through the third heat exchanger to be introduced into the inlet port of the first compressor, a fourth flow path switching valve to allow the first refrigerant having passed through the third flow path switching valve to flow to one of the fourth heat exchanger and the third heat exchanger, and a fifth flow path switching valve to allow the water to flow to one of the fourth heat exchanger and the fifth heat exchanger.

In a high-temperature water production mode, the fourth flow path switching valve may perform flow path switching to allow the first refrigerant to flow to the third heat exchanger, and the fifth flow path switching valve performs flow path switching to allow the water to flow to the fifth heat exchanger.

The second refrigerant compressed in the second compressor may be condensed in the fifth heat exchanger to exchange heat with the water, and evaporates in the third heat exchanger to exchange heat with the first refrigerant.

In a middle-temperature water production mode, the fourth flow path switching valve may perform flow path switching to allow the first refrigerant to flow to the fourth heat exchanger, and the fifth flow path switching valve performs flow path switching to allow the water to flow to the fourth heat exchanger.

In a low-temperature water production mode, the fourth flow path switching valve may perform flow path switching to allow the first refrigerant evaporated in the fourth heat exchanger to flow to the inlet port of the first compressor, and the fifth flow path switching valve may perform flow path switching to allow the water to flow to the fourth heat exchanger.

The first flow path switching valve, the second flow path switching valve, and the third flow path switching valve may be four-way valves.

The fourth flow path switching valve and the fifth flow path switching valve may be three-way valves.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
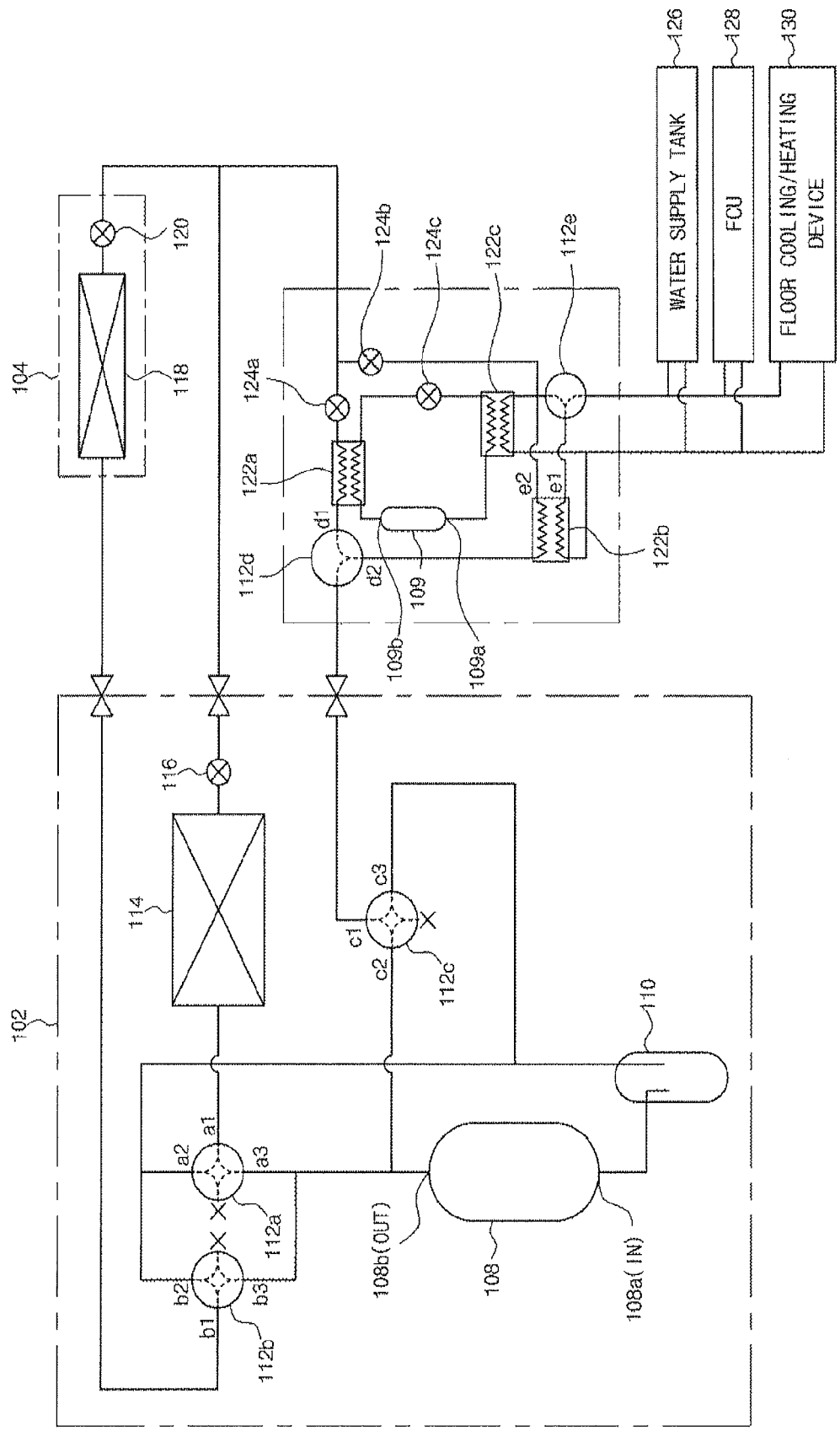
FIG. 1 is a view illustrating a heat pump apparatus according to an exemplary embodiment of the present invention.

Reference will now be made in detail to exemplary embodiments of the present invention, examples of which are illustrated in the accompanying drawings, wherein like reference numerals refer to like elements throughout.

FIG. 1 is a view illustrating a heat pump apparatus according to an exemplary embodiment of the present invention. As illustrated in FIG. 1, the heat pump apparatus 100 includes an outdoor unit 102, an indoor unit 104, and a hydro unit 106. The outdoor unit 102, the indoor unit 104, and the hydro unit 106 of the heat pump apparatus 100 are connected to each other via refrigerant pipes to construct a cycle.

The outdoor unit 102 includes a first compressor 108, an accumulator 110, a first flow path switching valve 112a, a second flow path switching valve 112b, a third flow path switching valve 112c, a first heat exchanger 114, and a first expansion valve 116.

The first expansion valve 116, that may be an electronic expansion valve, serves to expand a refrigerant and adjust the flow rate of the refrigerant, and to interrupt flow of the refrigerant if necessary. The first expansion valve 116 may be an expansion device of various structures but performing the above functions.

The first compressor 108 compresses a first refrigerant of lower temperature and lower pressure suctioned through an inlet port 108a, forming the first refrigerant of high temperature and high pressure. The first compressor 108 discharges the first refrigerant of high temperature and high pressure through an outlet port 108b. The first compressor 108 may include an inverter compressor, whose compression capacity may be variable depending upon input frequencies, or a combination of a plurality of constant-speed compressors having a constant compression capacity. The inlet port 108a of the first compressor 108 may be connected to the accumulator 110. The outlet port 108b of the first compressor 108 may be connected to the first flow path switching valve 112a, the second flow path switching valve 112b, and the third flow path switching valve 112c. The first flow path switching valve 112a, the second flow path switching valve 112b, and the third flow path switching valve 112c may be connected to the accumulator 110.

The first flow path switching valve 112a, the second flow path switching valve 112b, and the third flow path switching valve 112c may be configured as four-way valves. The first flow path switching valve 112a, the second flow path switching valve 112b, and the third flow path switching valve 112c selectively switch flow paths of the first refrigerant in a heat recovery mode, a heating mode, and a cooling mode, thereby securing flow paths of the first refrigerant necessary for operation in the respective modes.

The first flow path switching valve 112a performs switching between a flow path a1-a3 between the outlet port 108b of the first compressor 108 and the first heat exchanger 114 and a flow path a1-a2 between the inlet port 108a of the first compressor 108 and the first heat exchanger 114.

The second flow path switching valve 112b performs switching between a flow path b1-b3 between the outlet port 108b of the first compressor 108 and the indoor unit 104 and a flow path b1-b2 between the inlet port 108a of the first compressor 108 and the indoor unit 104.

The third flow path switching valve 112c performs switching between a flow path c1-c2 between the outlet port 108b of the first compressor 108 and the hydro unit 106 and a flow path c1-c3 between the inlet port 108a of the first compressor 108 and the hydro unit 106.

Each of the first flow path switching valve 112a, the second flow path switching valve 112b, and the third flow path switching valve 112c has four ports (passages through which the first refrigerant flows). According to an exemplary embodiment, one of the four ports may be closed and the other three ports are used. In FIG. 1, one port of each of the first flow path switching valve 112a, the second flow path switching valve 112b, and the third flow path switching valve 112c denoted by "X" is closed. According to an exemplary embodiment, therefore, three-way valves, each of which has three ports, or a combination of other valves functioning as the three-way valves may be used in place of the four-way valves each having four ports. The first flow path switching valve 112a, the second flow path switching valve 112b, and the third flow path switching valve 112c may be disposed inside or outside the outdoor unit 102.

The first heat exchanger 114 may function as a condenser in the cooling mode and as an evaporator in the heating mode. The first expansion valve 116 may be connected to one side of the first heat exchanger 114. An outdoor fan (not shown) may be mounted to the first heat exchanger 114 to improve heat exchange efficiency between the first refrigerant and the outdoor air.

The indoor unit 104 includes a second heat exchanger 118 and a second expansion valve 120. The second heat exchanger 118 may function as an evaporator in the cooling mode and as a condenser in the heating mode. The second expansion valve 120 may be connected to one side of the second heat exchanger 118. The second expansion valve 120 may be an electronic expansion valve. The second expansion valve 120 serves to expand the refrigerant and adjust the flow rate of the refrigerant, and to interrupt flow of the refrigerant if necessary. The second expansion valve 120 may be ran expansion device having a different structure but performing the above functions. An indoor fan (not shown) may be installed at the second heat exchanger 118 to improve heat exchange efficiency between the refrigerant and the indoor air. Two or more indoor units 104 may be provided as necessary.

The hydro unit 106 heats/cools water through heat exchange between a refrigerant and water such that the heated/cooled water may be used for heating/cooling. The hydro unit 106 includes a hot water heat exchanger 122 and a third expansion device 124. The hydro unit 106 includes a second compressor 109, a third heat exchanger 122a, a fourth heat exchanger 122b, a fifth heat exchanger 122c, a third expansion valve 124a, a fourth expansion valve 124b, a fifth expansion valve 124c, a fourth flow path switching valve 112d, and a fifth flow path switching valve 112e. the fourth flow path switching valve 112d forms a refrigerant flow path switching unit together with the first flow path switching valve 112a, the second flow path switching valve 112b, and the third flow path switching valve 112c. The fifth flow path switching valve 112e forms a water flow path switching unit.

The second compressor 109 compresses a second refrigerant of lower temperature and lower pressure suctioned through an inlet port 109a, forming the second refrigerant of high temperature and high pressure. The second compressor 109 discharges the second refrigerant of high temperature and high pressure through an outlet port 109b. The second compressor 109 may include an inverter compressor, whose compression capacity may be variable depending upon input frequencies, or a combination of a plurality of constant-speed compressors having a constant compression capacity.

The third heat exchanger 122a may be adapted to induce heat exchange between the first refrigerant and the second refrigerant. Heat produced as the first refrigerant compressed in the first compressor 108 may be condensed in the third heat exchanger 122a may be used to evaporate the second refrigerant compressed in the second compressor 109 and condensed in the fifth heat exchanger 122c.

Heat exchange plates through which the first refrigerant flows and heat exchange plates through which water flows may be alternately arranged in the fourth heat exchanger 122b. Heat exchange plates through which the second refrigerant flows and heat exchange plates through which water flows may be alternately arranged in the fifth heat exchanger 122c. Through heat exchange between the heat exchange plates through which the first refrigerant and the second refrigerant flow and the heat exchange plates through which water flows, high-temperature water, middle-temperature water, and low-temperature water are produced. The first refrigerant compressed in the first compressor 108 may be directly transferred to the fourth heat exchanger 122b of the hydro unit 106, or transferred to the fourth heat exchanger 122b via the outdoor unit 102 or the indoor unit 104. The second refrigerant compressed in the second compressor 109 may be directly transferred to the fifth heat exchanger 122c. The high-temperature water, middle-temperature water, and low-temperature water produced by the hydro unit 106 are supplied to a water supply tank 126, a fan coil unit 128, and a floor cooling/heating device 130.

The third expansion valve 124a, the fourth expansion valve 124b and the fifth expansion valve 124c, which may be electronic expansion valves, expand a refrigerant and adjust the flow rate of the refrigerant, and to interrupt flow of the refrigerant as necessary. The third expansion valve 124a, the fourth expansion valve 124b and the fifth expansion valve 124c may be replaced with other expansion devices having a different structure but performing the above functions.

The fourth flow path switching valve 112d and the fifth flow path switching valve 112e may include three-way valves. The fourth flow path switching valve 112d and the fifth flow path switching valve 112e selectively switch the flow paths of the first refrigerant and the flow paths of water in the heat recovery mode, heating mode, and cooling mode, thereby forming flow paths of the first refrigerant and water necessary for operation in the respective modes.

The fourth flow path switching valve 112d performs switching between a flow path d1 between the third flow path switching valve 112c and the third heat exchanger 122a and a flow path d2 between the third flow path switching valve 112c and the fourth heat exchanger 122b.

The fifth flow path switching valve 112e forms a flow path e1 through which water flows into the fourth heat exchanger 122b, or switches to a flow path e2 to allow water to flow into the fifth heat exchanger 122c.

Figure 2:
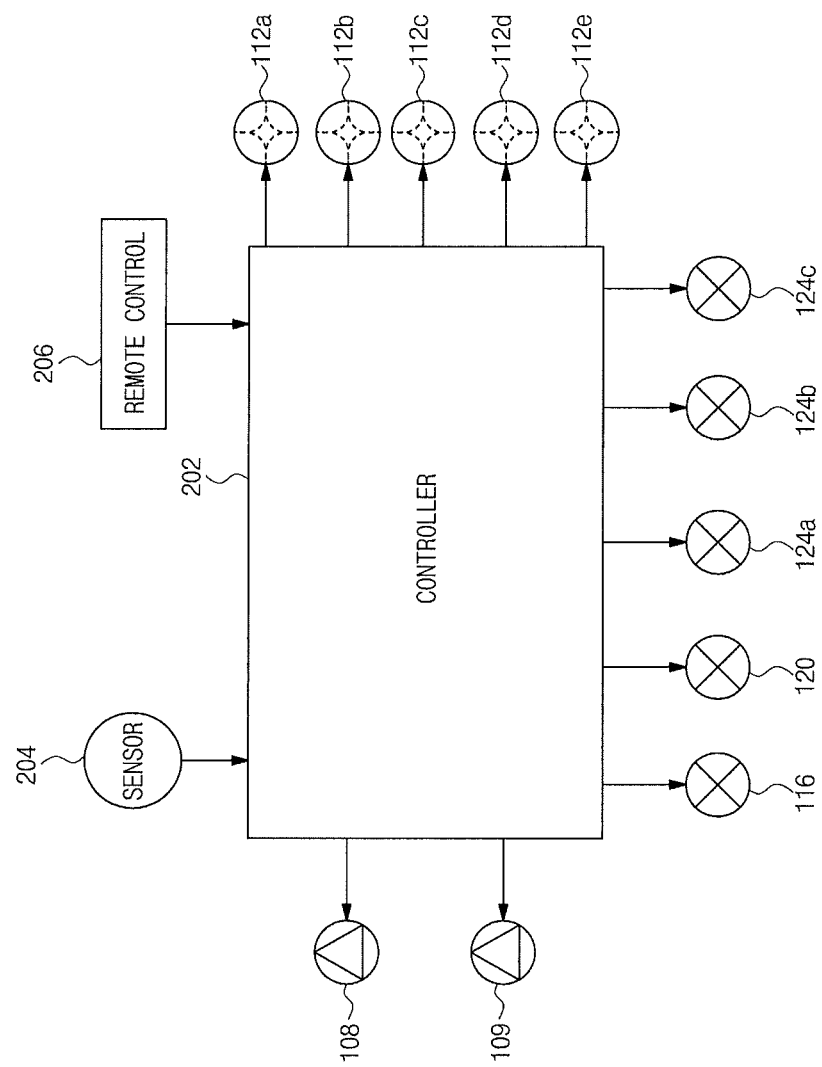
FIG. 2 is a view illustrating a control system of an exemplary heat pump apparatus.

FIG. 2 is a view illustrating an exemplary control system of a heat pump apparatus. As illustrated in FIG. 2, a controller 202 controls operations of the first compressor 108, the second compressor 109, the first expansion valve 116, the second expansion valve 120, the third expansion valve 124a, the fourth expansion valve 124b, the fifth expansion valve 124c, the first flow path switching valve 112a, the second flow path switching valve 112b, the third flow path switching valve 112c, the fourth flow path switching valve 112d, and the fifth flow path switching valve 112e, based on signals received from a sensor 204 and a remote control 206. The heat pump apparatus 100 performs operations of the heating mode, the cooling mode, and the heat recovery mode and at the same time operations of a high-temperature water production mode, a middle-temperature water production mode, and a low-temperature water production mode, according to control operation by the controller 202.

According to an exemplary embodiment, the air-to-air mode may be a cooling/heating mode using the indoor unit 104. In the air-to-air mode, cooling/heating operation may be performed through heat exchange between the first refrigerant and air in the indoor unit 104. The air-to-water mode may be a cooling/heating mode using the hydro unit 106. In the air-to-water mode, cooling/heating operation may be performed through heat exchange between the first refrigerant and water in the fourth heat exchanger 122b of the hydro unit 106, or heating operation may be performed through heat exchange between the second refrigerant and water in the fifth heat exchanger 122c. In the air-to-water mode, heat exchange may be performed between air and the water having been heat-exchanged with the refrigerant to perform the cooling/heating operation.

Figure 3:
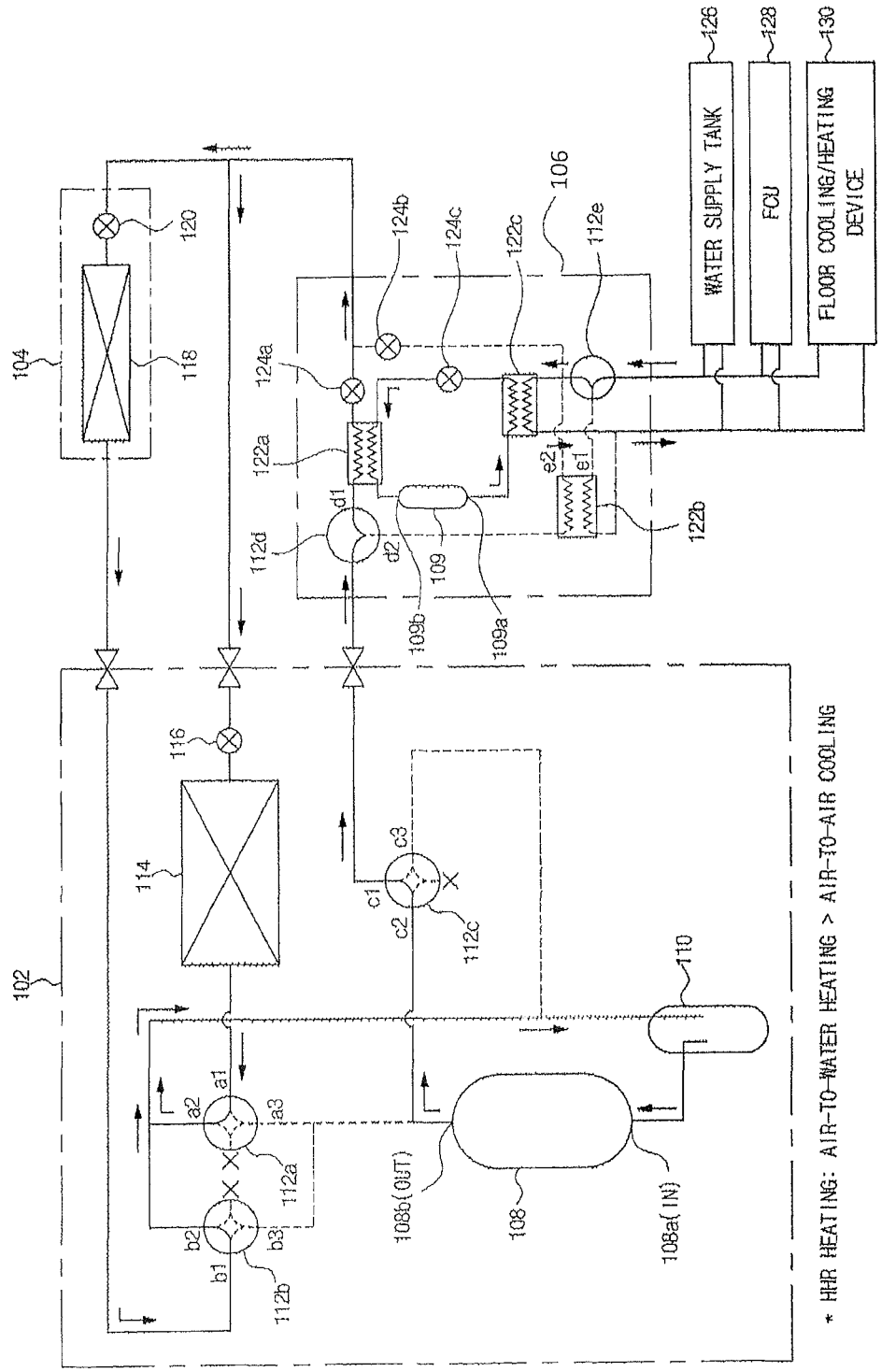
FIG. 3 is a view illustrating an exemplary refrigeration cycle in a heat recovery heating mode, in which a heating capacity needed in the air-to-water heating mode may be greater than a cooling capacity needed in the air-to-air cooling mode (air-to-water heating >air-to-air cooling) and that may be in a high-temperature water production mode.
Figure 4:
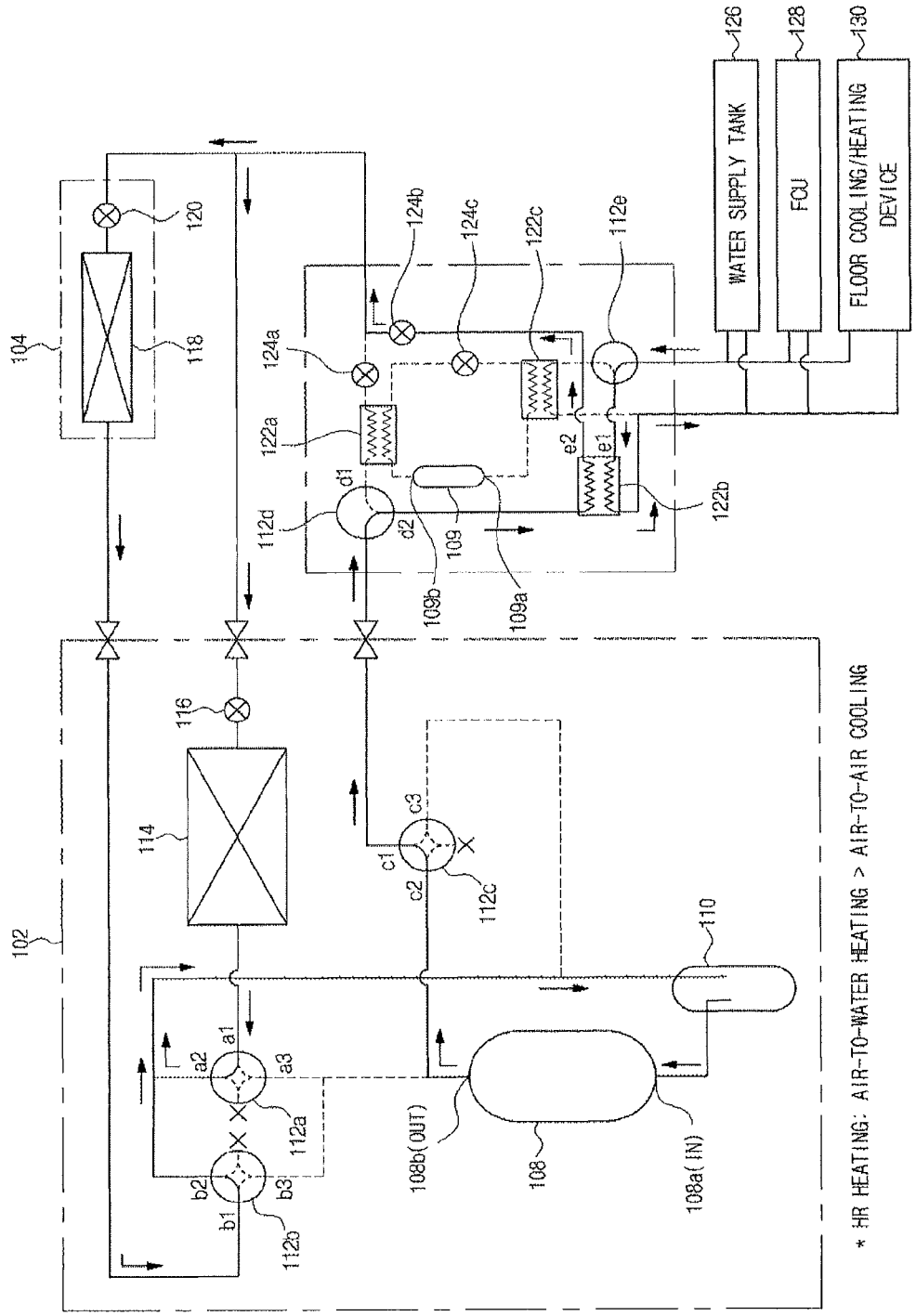
FIG. 4 is a view illustrating an exemplary refrigeration cycle, which may be a middle-temperature water production mode in the heat recovery heating mode.
Figure 5:
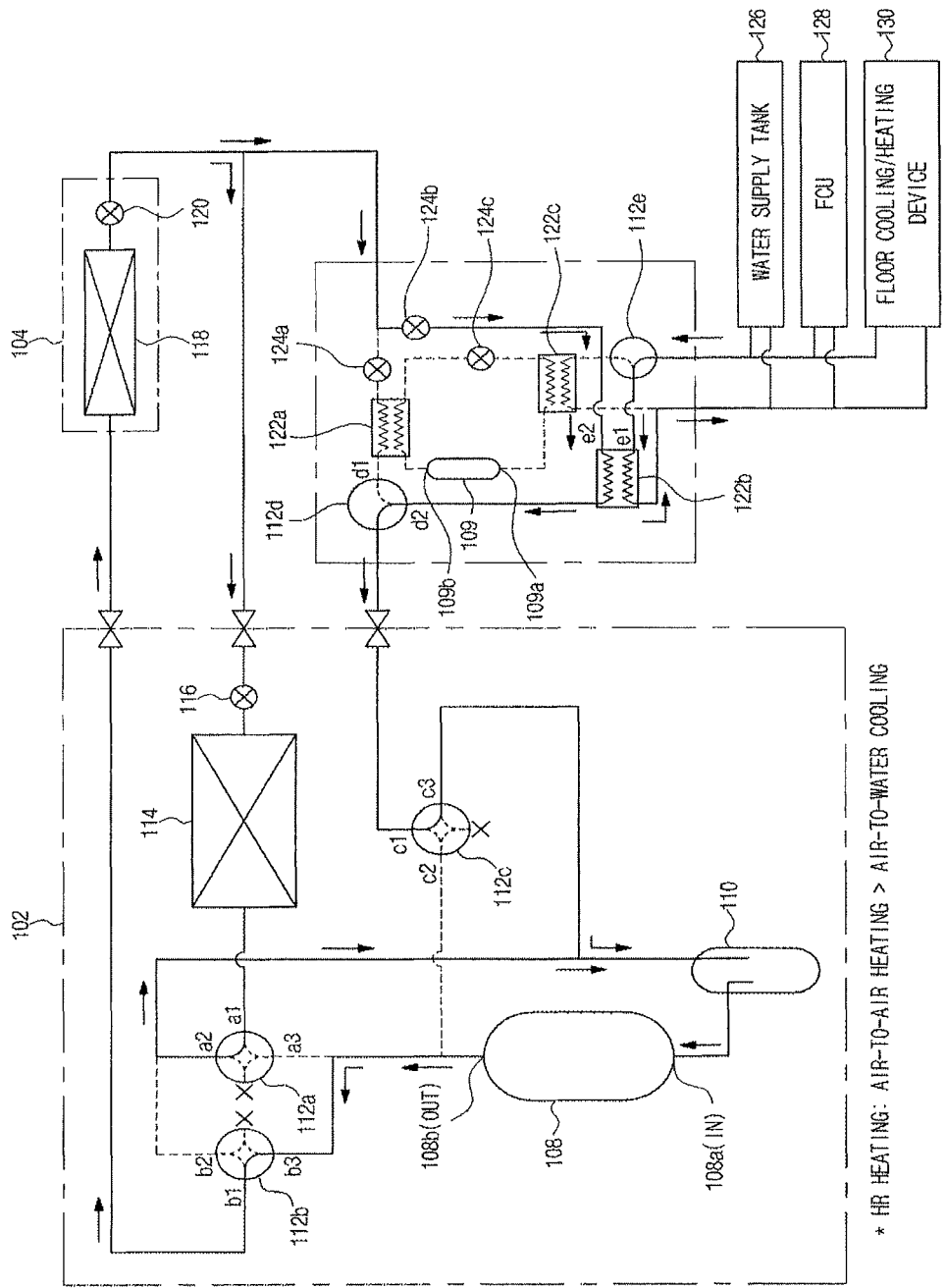
FIG. 5 is a view illustrating an exemplary refrigeration cycle in the heat recovery heating mode, in which the heating capacity needed in the air-to-air heating mode may be greater than the cooling capacity needed in the air-to-water cooling mode (air-to-air heating >air-to-water cooling) and that may be a low-temperature water production mode.
Figure 6:
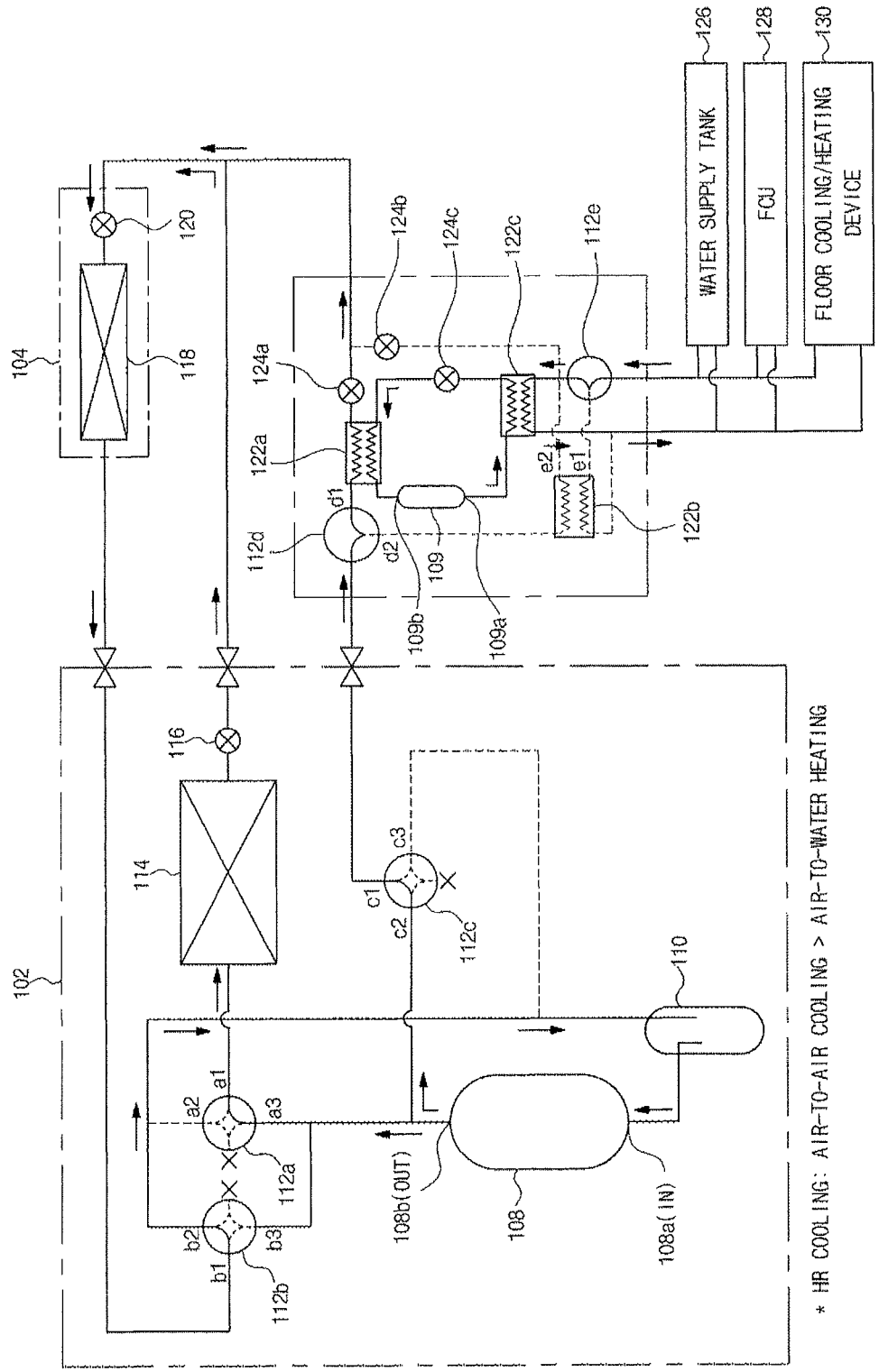
FIG. 6 is a view illustrating an exemplary refrigeration cycle in the heat recovery heating mode, in which the cooling capacity needed in the air-to-air cooling mode may be greater than the heating capacity needed in the air-to-water heating mode (air-to-air cooling >air-to-water heating) and that may be in the high-temperature water production mode.
Figure 7:
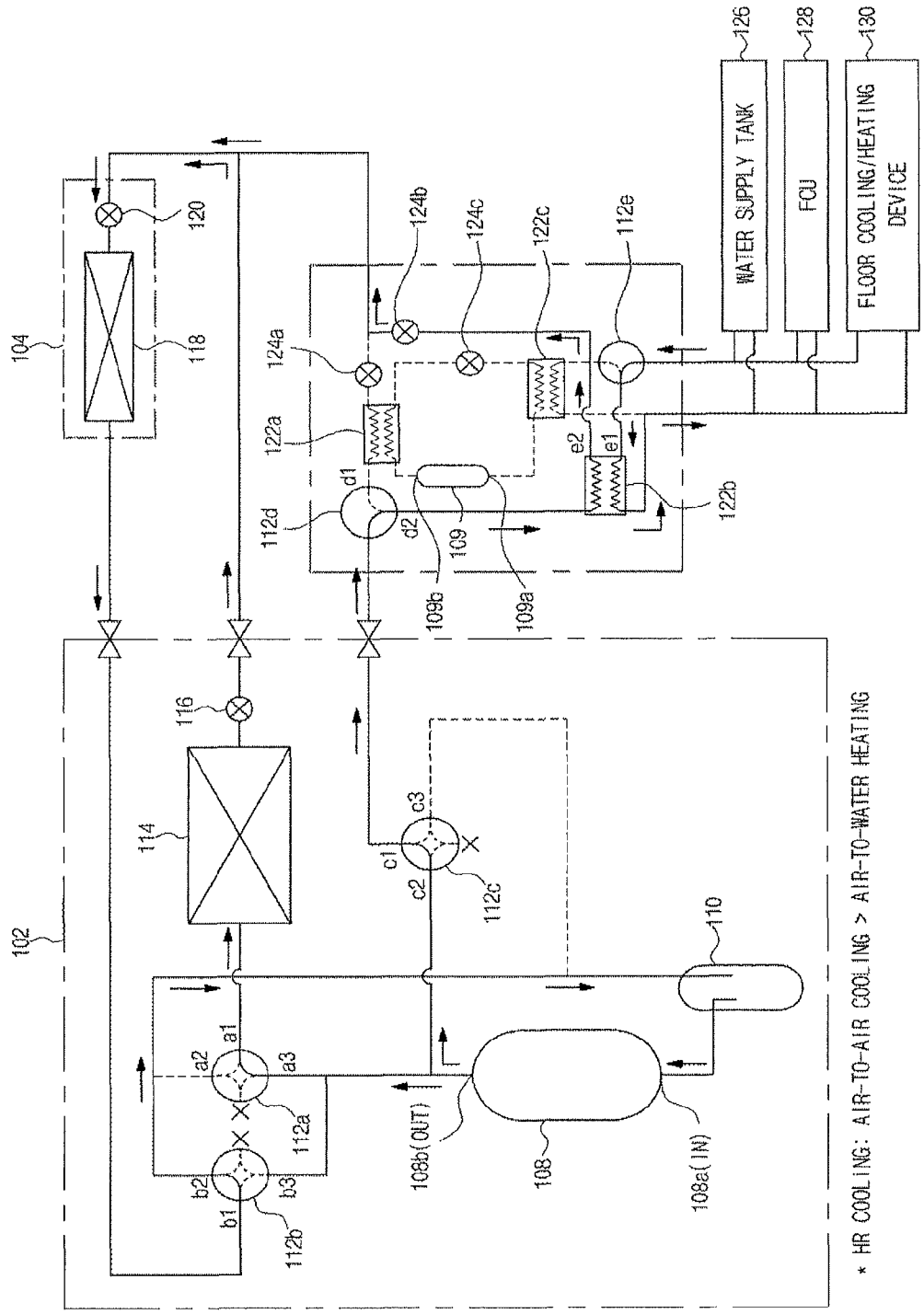
FIG. 7 is a view illustrating an exemplary refrigeration cycle in the heat recovery heating mode, which may be in the middle-temperature water production mode.
Figure 8:
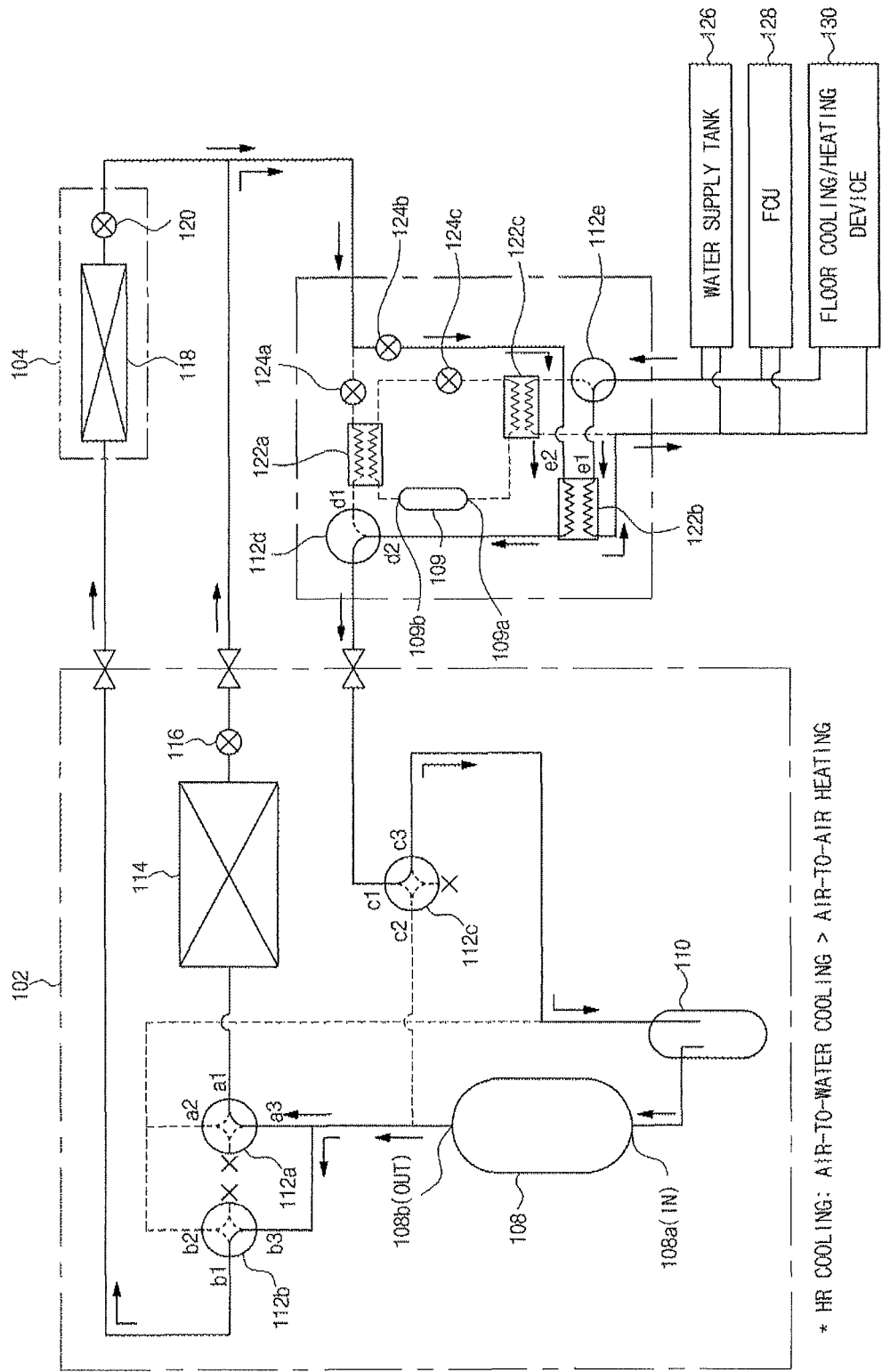
FIG. 8 is a view illustrating an exemplary refrigeration cycle in the heat recovery heating mode, in which the cooling capacity needed in the air-to-water cooling mode may be greater than the heating capacity needed in the air-to-air heating mode (air-to-water cooling >air-to-air heating) and that may be in the low-temperature water production mode.

FIGS. 3 to 8 are views illustrating exemplary heat recovery heating/cooling modes of a heat pump according to an embodiment of the present invention. FIGS. 3 and 4 are views illustrating an exemplary high-temperature water production mode and a middle-temperature water production mode in the heat recovery heating mode, and FIG. 5 is a view illustrating a low-temperature water production mode in the heat recovery heating mode. FIGS. 6 and 7 are views illustrating a high-temperature water production mode and a middle-temperature water production mode in the heat recovery cooling mode, and FIG. 8 is a view illustrating a low-temperature water production mode in the heat recovery cooling mode.

FIG. 3 is a view heat illustrating a refrigeration cycle in a heat recovery heating mode, in which a heating capacity needed in the air-to-water heating mode may be greater than a cooling capacity needed in the air-to-air cooling mode (air-to-water heating >air-to-air cooling) and that may be in a high-temperature water production mode. FIG. 4 is a view illustrating the refrigeration cycle of FIG. 3, which may be a middle-temperature water production mode, and FIG. 5 is a view illustrating a refrigeration cycle in the heat recovery heating mode, in which the heating capacity needed in the air-to-air heating mode may be greater than the cooling capacity needed in the air-to-water cooling mode (air-to-air heating >air-to-water cooling) and that may be a low-temperature water production mode. FIG. 6 is a view illustrating a refrigeration cycle in the heat recovery heating mode, in which the cooling capacity needed in the air-to-air cooling mode may be greater than the heating capacity needed in the air-to-water heating mode (air-to-air cooling >air-to-water heating) and that may be in the high-temperature water production mode. FIG. 7 is a view illustrating the refrigeration cycle of FIG. 6, which may be in the middle-temperature water production mode, and FIG. 8 is a view illustrating a refrigeration cycle in the heat recovery heating mode, in which the cooling capacity needed in the air-to-water cooling mode may be greater than the heating capacity needed in the air-to-air heating mode (air-to-air cooling >air-to-air heating) and that may be in the low-temperature water production mode.

In the heat recovery mode illustrated in FIGS. 3 to 8, the controller 202 controls the refrigerant flow path switching unit 112a, 112b, 112c and 112d to switch the refrigerant flow paths among the first compressor 108, the first heat exchanger 114, the indoor unit 104, and the hydro unit 106, such that simultaneous heating and cooling operations and/or simultaneous cooling and heating operations through the indoor unit 104 and the hydro unit 106 may be performed.

Heat Recovery Heating Mode: Air-to-Water Heating >Air-to-Air Cooling, High-Temperature Water Production Mode In the heat recovery heating mode and high-temperature water production mode illustrated in FIG. 3, the controller 202, for example, illustrated in FIG. 2, of the heat pump apparatus 100 controls the first flow path switching valve 112a to form the flow path a1-a2 such that the heat pump apparatus 100 may be operated in the heating mode. The controller 202 controls the second flow path switching valve 112b to form the flow path b1-b2 such that the first refrigerant of high temperature and high pressure discharged from the first compressor 108 does not flow to the indoor unit 104. The controller 202 controls the third flow path switching valve 112c to form the flow path c1-c2 such that the first refrigerant of high temperature and high pressure discharged from the first compressor 108 flows to the hydro unit 106. As a result, the first refrigerant of high temperature and high pressure discharged from the first compressor 108 may be supplied to the hydro unit 106, thereby performing air-to-water heating through the hydro unit 106. The first refrigerant, heat-exchanged in the hydro unit 106, may be supplied to the indoor unit 104 such that the first refrigerant may be used to implement the air-to-air cooling mode.

The controller 202 controls the fourth flow path switching valve 112d to form the flow path d1 such that the first refrigerant of high temperature and high pressure discharged from the first compressor 108 may be condensed in the third heat exchanger 122a. Heat produced as the first refrigerant may be condensed in the third heat exchanger 122a may be used to evaporate the second refrigerant discharged from the second compressor 109 and condensed in the fifth heat exchanger 122c. The controller 202 controls the fifth flow path switching valve 112e to form the flow path e2 such that water may flow to the fifth heat exchanger 122c and absorb heat produced as the second refrigerant may be condensed in the fifth heat exchanger 122c. By forming a circulation cycle of the second refrigerant in the hydro unit 106, separately from the first refrigerant, and causing heat exchange to occur between the first refrigerant and the second refrigerant in the third heat exchanger 122a as above, water temperature may be increased to a high temperature, for example, over 50° C. The third expansion valve 124a may be open to allow the first refrigerant having passed through the third heat exchanger 122a to flow to the first heat exchanger 114 or the second heat exchanger 118, while the fourth expansion valve 124b may be closed to prevent the first refrigerant having passed through the third heat exchanger 122a from flowing to the fourth heat exchanger 122b.

As illustrated in FIG. 3, the first flow path switching valve 112a, the second flow path switching valve 112b, and the third flow path switching valve 112c may be controlled such that air-to-water heating and air-to-air cooling are simultaneously performed in the heat recovery heating mode. The degrees of opening of the first expansion valve 116 provided in the outdoor unit 102 and the second expansion valve 120 provided in the indoor unit 104 may be adjusted to control the flow rates of the first refrigerant flowing into the outdoor unit 102 and the indoor unit 104. Thereby, the air-to-water heating capacity of the hydro unit 106 and the air-to-air cooling capacity of the indoor unit 104 may be freely combined to produce a desired capacity without loss within a range equivalent to 100% the capacity of the outdoor unit 102 (air-to-water heating >air-to-air cooling in FIG. 3). The indoor unit 104 for the air-to-air mode may be used without adding a separate indoor unit for the air-to-water mode, thereby greatly reducing unit cost of products, and installation cost, time, and labor.

Heat Recovery Heating Mode: Air-to-Water Heating >Air-to-Air Cooling, Middle-Temperature Water Production Mode As illustrated in FIG. 4, in the heat recovery heating mode and middle-temperature water production mode, the controller 202 controls the fourth flow path switching valve 112d to form the flow path d2 such that the first refrigerant of high temperature and high pressure discharged from the first compressor 108 may be condensed in the fourth heat exchanger 122b. Heat produced as the first refrigerant may be condensed in the fourth heat exchanger 122b may be used to heat water. The controller 202 controls the fifth flow path switching valve 112e to form the flow path e1 such that water flows into the fourth heat exchanger 122b and absorbs heat produced as the second refrigerant may be condensed in the fourth heat exchanger 122b. The third expansion valve 124a may be closed to prevent the first refrigerant from flowing to the third heat exchanger 122a, while the fourth expansion valve 124b may be open to allow the first refrigerant having passed through the fourth heat exchanger 122b to flow to the first heat exchanger 114 or the second heat exchanger 118.

Heat Recovery Heating Mode: Air-to-Air Heating >Air-to-Water Cooling, Low-Temperature Water Production Mode In the heat recovery heating mode and low-temperature water production mode illustrated in FIG. 5, the controller 202 of the heat pump apparatus 100 controls the first flow path switching valve 112a to form the flow path a1-a2 such that the heat pump apparatus 100 may be operated in the heating mode. The controller 202 controls the second flow path switching valve 112b to form the flow path b1-b3 such that the first refrigerant of high temperature and high pressure discharged from the first compressor 108 flows to the indoor unit 104. The controller 202 controls the third flow path switching valve 112c to form the flow path c1-c3 such that the first refrigerant of high temperature and high pressure discharged from the first compressor 108 does not flow to the hydro unit 106. Thereby, the first refrigerant of high temperature and high pressure discharged from the first compressor 108 may be supplied to the indoor unit 104, thereby performing air-to-air heating through the indoor unit 104. The first refrigerant whose temperature has been decreased by heating operation of the indoor unit 104 may be supplied to the hydro unit 106 such that the first refrigerant may be used to implement the air-to-water cooling mode.

The controller 202 controls the fourth flow path switching valve 112d to form the flow path d2 such that the first refrigerant evaporated in the fourth heat exchanger 122b flows to the inlet port 108a of the first compressor 108.

When the first refrigerant evaporates in the fourth heat exchanger 122b, the first refrigerant absorbs heat from water introduced into the fourth heat exchanger 122b. The controller 202 controls the fifth flow path switching valve 112e to form the flow path e1 such that water flows to the fourth heat exchanger 122b and loses heat when the first refrigerant evaporates in the fourth heat exchanger 122b. The third expansion valve 124a may be closed to prevent the first refrigerant from flowing to the third heat exchanger 122a, while the fourth expansion valve 124b may be open to allow the first refrigerant compressed in the first heat exchanger 114 or the second heat exchanger 118 to flow to the fourth heat exchanger 122b.

As illustrated in FIG. 5, the first flow path switching valve 112a, the second flow path switching valve 112b, and the third flow path switching valve 112c may be controlled such that air-to-air heating and air-to-water cooling are simultaneously performed in the heat recovery heating mode. The degrees of opening of the first expansion valve 116 provided in the outdoor unit 102 and the fourth expansion valve 124b provided in the hydro unit 106 may be adjusted to control the flow rates of the refrigerant flowing into the outdoor unit 102 and the hydro unit 106. Thereby, the air-to-air heating capacity and the air-to-water cooling capacity may be freely combined to produce a desired capacity without loss within the range equivalent to 100% the capacity of the outdoor unit 102 (air-to-air heating >air-to-water cooling in FIG. 5). The indoor unit 104 for the air-to-air mode may be used without adding a separate indoor unit for the air-to-water mode, thereby greatly reducing unit cost of products, and installation cost, time, and labor.

Heat Recovery Cooling Mode: Air-to-Air Cooling >Air-to-Water Heating, High-Temperature Water Production Mode In the heat recovery cooling mode and high-temperature water production mode illustrated in FIG. 6, the controller 202 of the heat pump apparatus 100 controls the first flow path switching valve 112a to form the flow path a1-a3 such that the heat pump apparatus 100 may be operated in the cooling mode. The controller 202 controls the second flow path switching valve 112b to form the flow path b1-b2 such that the first refrigerant of high temperature and high pressure discharged from the first compressor 108 does not flow to the indoor unit 104. The controller 202 controls the third flow path switching valve 112c to form the flow path c1-c2 such that the first refrigerant of high temperature and high pressure discharged from the first compressor 108 flows to the hydro unit 106. Thereby, the first refrigerant of high temperature and high pressure discharged from the first compressor 108 and condensed in the first heat exchanger 114 may be supplied to the indoor unit 104, thereby performing air-to-air cooling. The first refrigerant of high temperature and high pressure discharged from the first compressor 108 may be also supplied to the hydro unit 106, thereby performing air-to-water heating through the hydro unit 106. The first refrigerant whose temperature has been decreased in the hydro unit 106 may be recovered by the first compressor 108 via the indoor unit 106.

The controller 202 controls the fourth flow path switching valve 112d to form the flow path d1 such that the first refrigerant of high temperature and high pressure discharged from the first compressor 108 may be condensed in the third heat exchanger 122a. Heat produced as the first refrigerant may be condensed in the third heat exchanger 122a may be used to evaporate the second refrigerant discharged from the second compressor 109 and condensed in the fifth heat exchanger 122c. The controller 202 controls the fifth flow path switching valve 112e to form the flow path e2 such that water may flow to the fifth heat exchanger 122c and absorb heat produced as the second refrigerant may be condensed in the fifth heat exchanger 122c. By forming a circulation cycle of the second refrigerant in the hydro unit 106, separately from the first refrigerant, and causing heat exchange to occur between the first refrigerant and the second refrigerant in the third heat exchanger 122a as above, water temperature may be increased to a high temperature, for example, over 50° C. The third expansion valve 124a may be open to allow the first refrigerant having passed through the third heat exchanger 122a to flow to the first heat exchanger 114 or the second heat exchanger 118, while the fourth expansion valve 124b may be closed to prevent the first refrigerant having passed through the third heat exchanger 122a from flowing to the fourth heat exchanger 122b.

As illustrated in FIG. 6, the first flow path switching valve 112a, the second flow path switching valve 112b, and the third flow path switching valve 112c may be controlled such that air-to-air cooling and air-to-water heating are simultaneously performed in the heat recovery heating mode. The degrees of opening of the first expansion valve 116 provided in the outdoor unit 102 and the second expansion valve 120 provided in the indoor unit 104 may be adjusted to control the flow rates of the refrigerant flowing into the hydro unit 106 and the indoor unit 104. Thereby, the air-to-water heating capacity and the air-to-air cooling capacity may be freely combined to produce a desired capacity without loss within the range equivalent to 100% the capacity of the outdoor unit 102 (air-to-air cooling >air-to-water heating in FIG. 6). The indoor unit 104 for the air-to-air mode may be used without adding a separate indoor unit for the air-to-water mode, thereby greatly reducing unit cost of products, and installation cost, time, and labor.

Heat Recovery Cooling Mode: Air-to-Air Cooling >Air-to-Water Heating, Middle-Temperature Water Production Mode As illustrated in FIG. 7, in the heat recovery cooling mode and middle-temperature water production mode, the controller 202 controls the fourth flow path switching valve 112d to form the flow path d2 such that the first refrigerant of high temperature and high pressure discharged from the first compressor 108 may be condensed in the fourth heat exchanger 122b. Heat produced as the first refrigerant may be condensed in the fourth heat exchanger 122b may be used to heat water. The controller 202 controls the fifth flow path switching valve 112e to form the flow path e1 such that water flows into the fourth heat exchanger 122b and absorbs heat produced as the second refrigerant may be condensed in the fourth heat exchanger 122b. The third expansion valve 124a may be closed to prevent the first refrigerant from flowing to the third heat exchanger 122a, while the fourth expansion valve 124b may be open to allow the first refrigerant having passed through the fourth heat exchanger 122b to flow to the first heat exchanger 114 or the second heat exchanger 118.

Heat Recovery Cooling Mode: Air-to-Water Cooling >Air-to-Air Heating, Low-Temperature Water Production Mode In the heat recovery cooling mode and low-temperature water production mode illustrated in FIG. 8, the controller 202 of the heat pump apparatus 100 controls the first flow path switching valve 112a to form the flow path a1-a3 such that the heat pump apparatus 100 may be operated in the cooling mode. The controller 202 controls the second flow path switching valve 112b to form the flow path b1-b3 such that the first refrigerant of high temperature and high pressure discharged from the first compressor 108 flows to the indoor unit 104. The controller 202 controls the third flow path switching valve 112c to form the flow path c1-c3 such that the first refrigerant of high temperature and high pressure discharged from the first compressor 108 does not flow to the hydro unit 106. Thereby, the first refrigerant of high temperature and high pressure discharged from the first compressor 108 may be supplied to the indoor unit 104, thereby performing air-to-air heating. The first refrigerant of high temperature and high pressure discharged from the first compressor 108 may be condensed through the first heat exchanger 114 and supplied to the hydro unit 106, thereby performing air-to-water cooling through the hydro unit 106. The first refrigerant whose temperature has been decreased in the indoor unit 104 may be recovered by the first compressor 108 via the hydro unit 106.

The controller 202 controls the fourth flow path switching valve 112d to form the flow path d2 such that the first refrigerant evaporated in the fourth heat exchanger 122b flows to the inlet port 108a of the first compressor 108. When the first refrigerant evaporates in the fourth heat exchanger 122b, the first refrigerant absorbs heat from water introduced into the fourth heat exchanger 122b. The controller 202 controls the fifth flow path switching valve 112e to form the flow path e1 such that water flows to the fourth heat exchanger 122b and loses heat when the first refrigerant evaporates in the fourth heat exchanger 122b. The third expansion valve 124a may be closed to prevent the first refrigerant from flowing to the third heat exchanger 122a, while the fourth expansion valve 124b may be open to allow the first refrigerant compressed in the first heat exchanger 114 or the second heat exchanger 118 to flow to the fourth heat exchanger 122b.

As illustrated in FIG. 8, the first flow path switching valve 112a, the second flow path switching valve 112b, and the third flow path switching valve 112c may be controlled such that air-to-water cooling and air-to-air heating are simultaneously performed in the heat recovery cooling mode. The degrees of opening of the first expansion valve 116 provided in the outdoor unit 102, the second expansion valve 120 provided in the indoor unit 104, and the fourth expansion valve 124b provided in the hydro unit 106 may be adjusted to control the flow rates of the refrigerant flowing into the outdoor unit 102 and the indoor unit 104. Thereby, the air-to-water cooling capacity and the air-to-air heating capacity may be freely combined to produce a desired capacity without loss within the range equivalent to 100% the capacity of the outdoor unit 102 (air-to-water cooling >air-to-air heating in FIG. 8). The indoor unit 104 for the air-to-air mode may be used without adding a separate indoor unit for the air-to-water mode, thereby greatly reducing unit cost of products, and installation cost, time, and labor.

Figure 9:
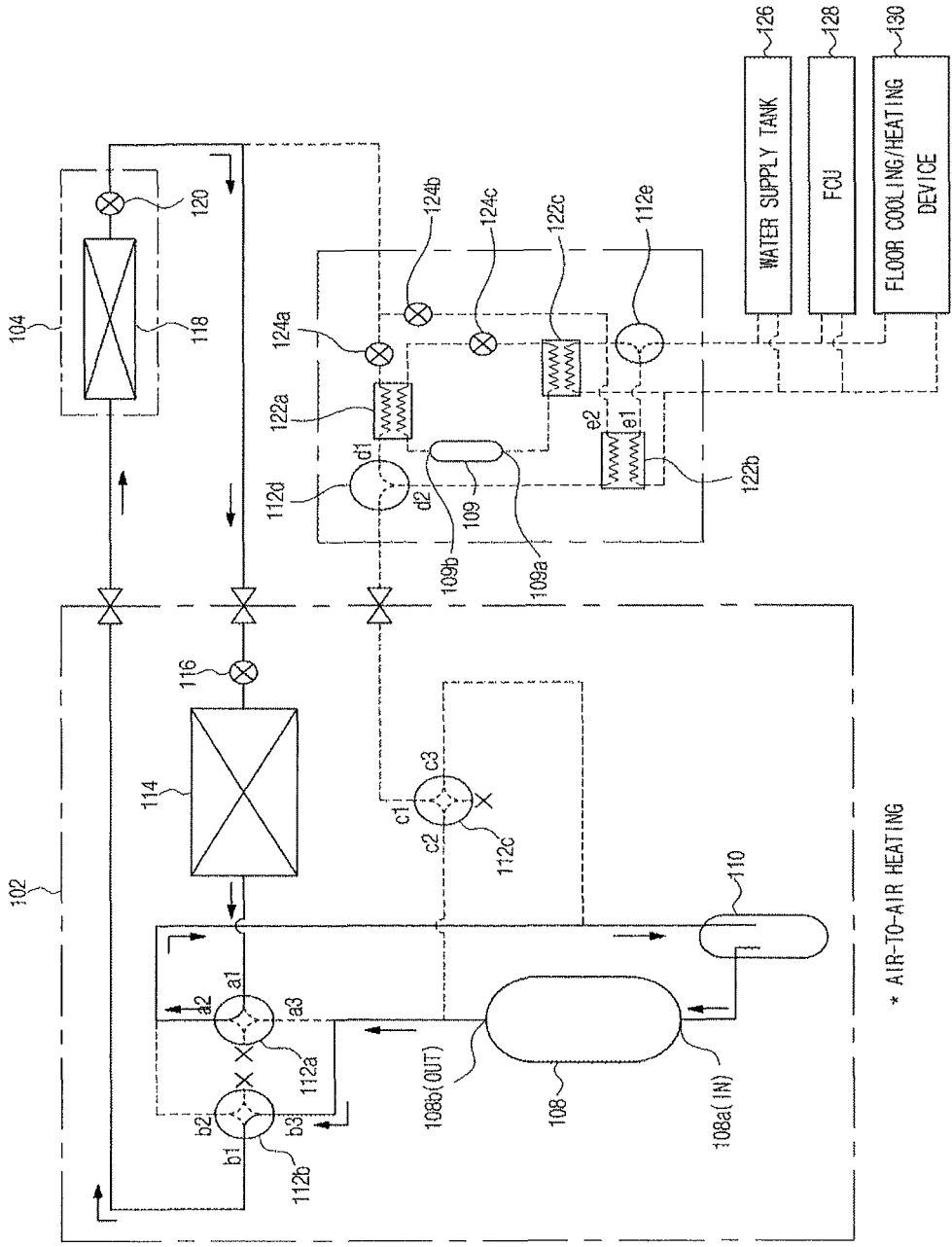
FIG. 9 is a view illustrating an exemplary heating mode to heat air in an air conditioning space through the indoor unit (referred to as an air-to-air heating mode)
Figure 10:
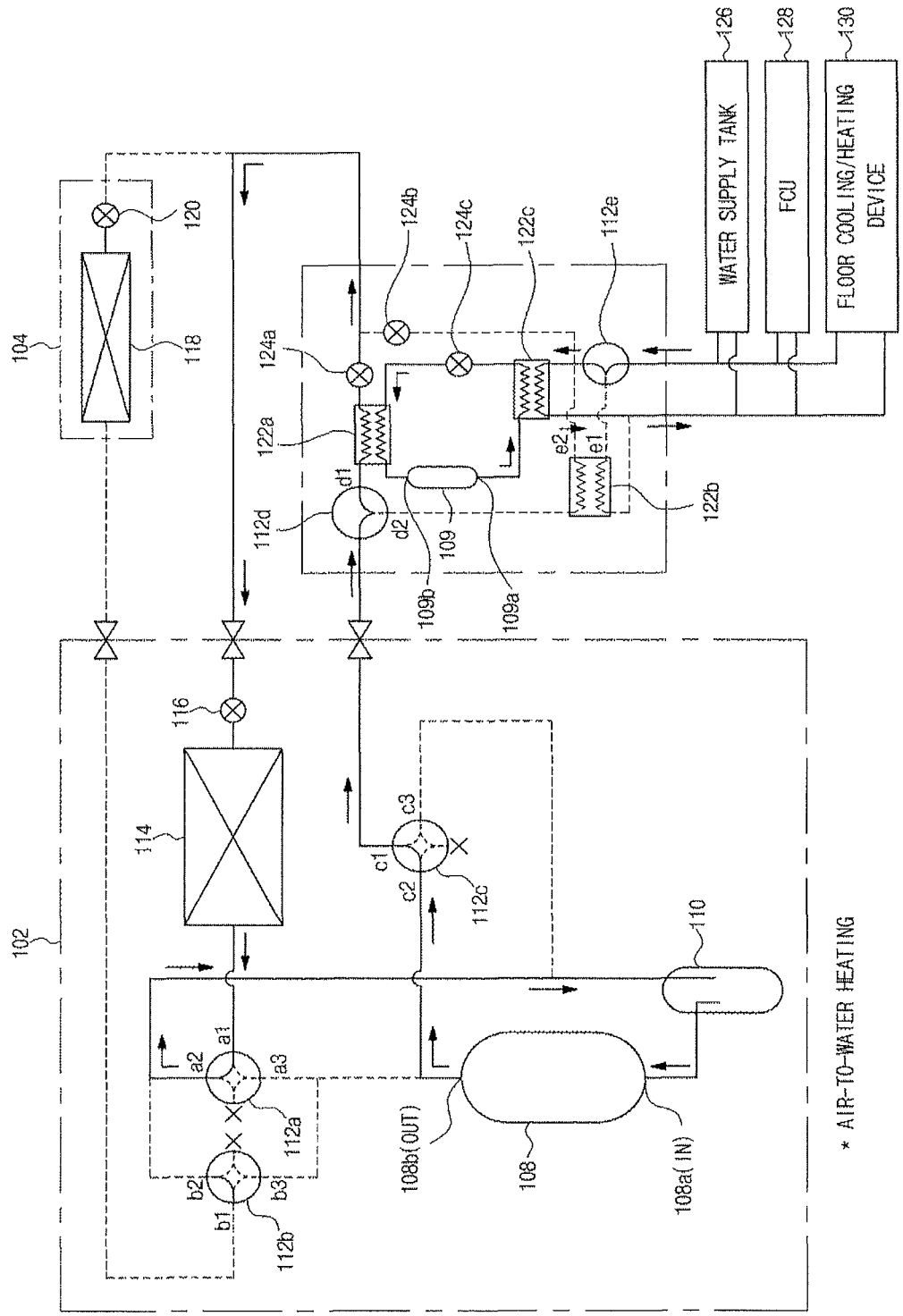
FIG. 10 is a view illustrating an exemplary heating mode to perform heating using heated water in the hydro unit (referred to as an air-to-water heating mode) and a high-temperature water production mode.
Figure 11:
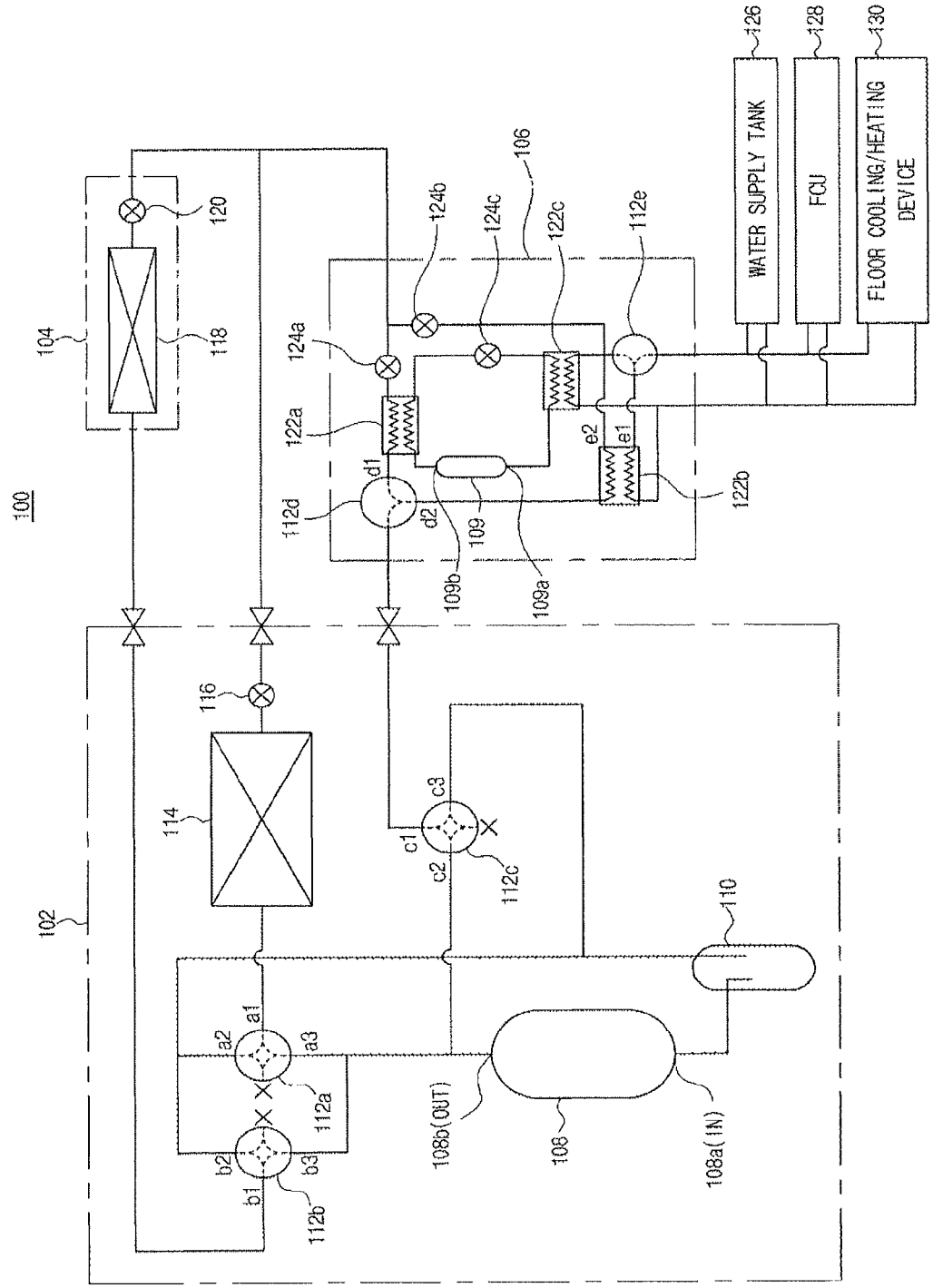
FIG. 11 is a view illustrating an exemplary heating mode to perform heating using heated water in the hydro unit (referred to as an air-to-water heating mode) and a middle-temperature water production mode.
Figure 12:
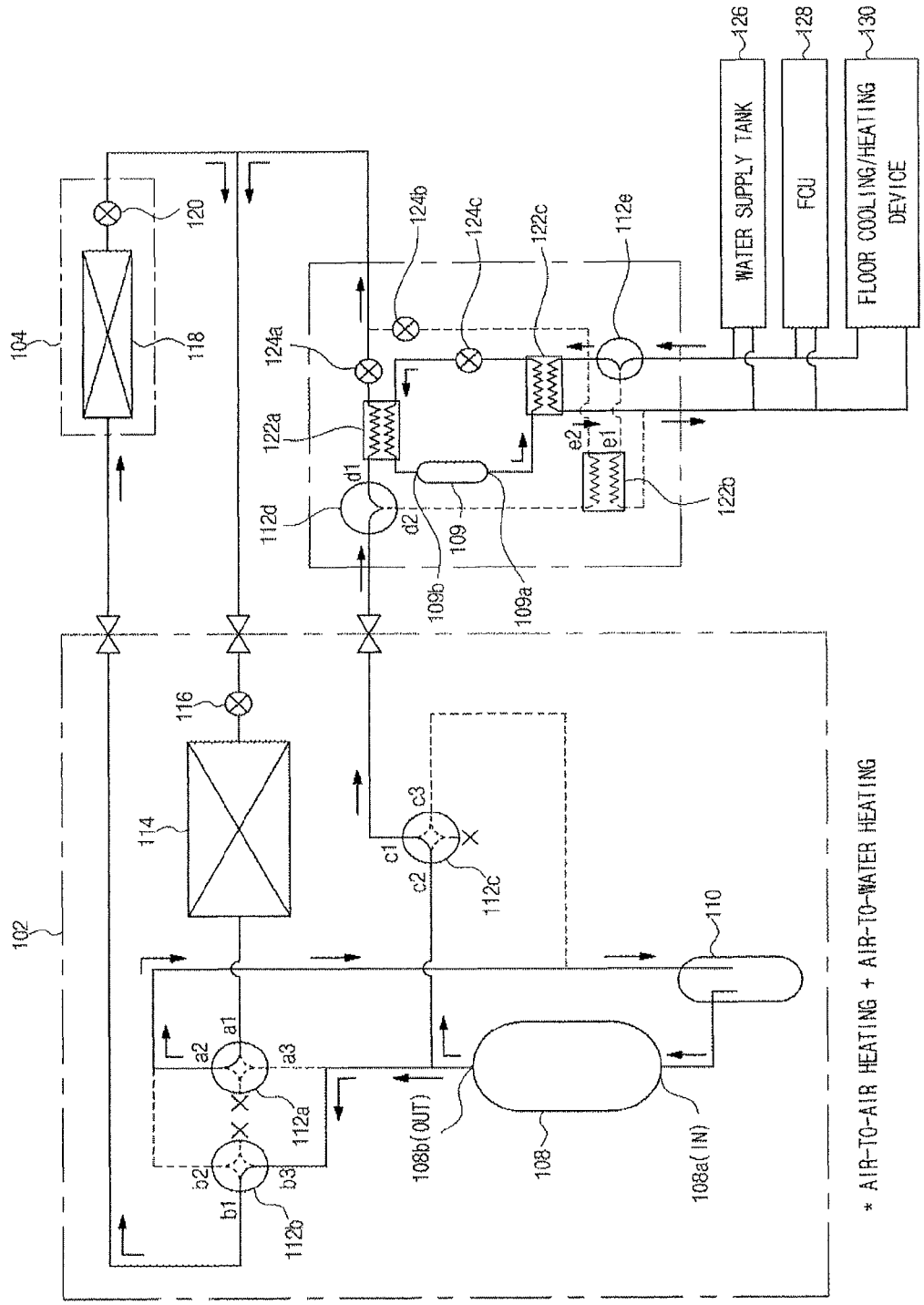
FIG. 12 is a view illustrating an exemplary combined heating mode in which the air-to-air heating mode and the air-to-water heating mode are simultaneously performed, and the high-temperature water production mode.
Figure 13:
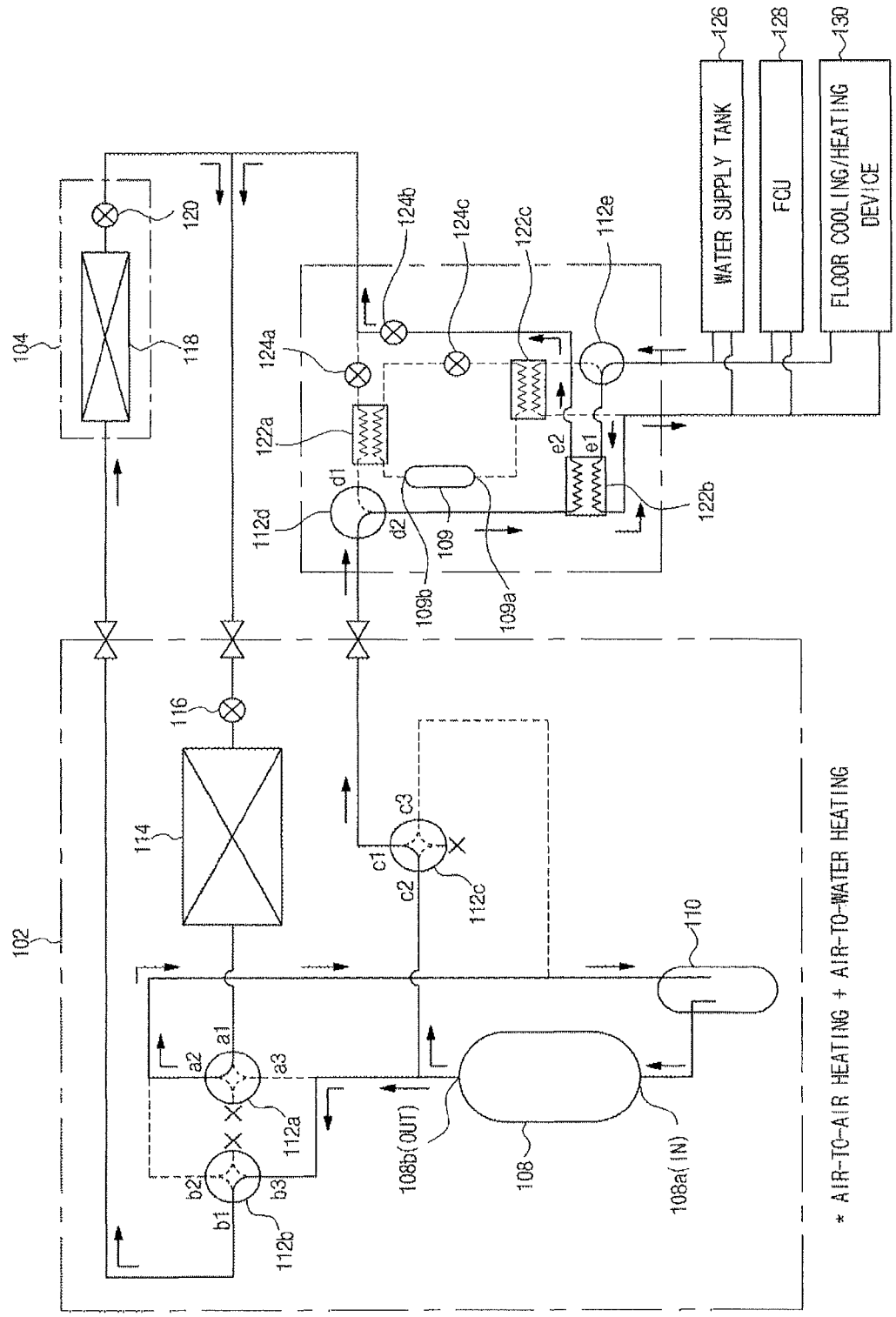
FIG. 13 is a view illustrating an exemplary combined heating mode in which the air-to-air heating mode and the air-to-water heating mode are simultaneously performed, and the middle-temperature water production mode.

FIGS. 9 to 13 are views illustrating heating modes of the heat pump according to an exemplary embodiment. FIG. 9 is a view illustrating a heating mode to heat air in an air conditioning space through the indoor unit (referred to as an air-to-air heating mode). FIG. 10 is a view illustrating a heating mode to perform heating using heated water in the hydro unit (referred to as an air-to-water heating mode) and a high-temperature water production mode. FIG. 11 is a view illustrating a heating mode to perform heating using heated water in the hydro unit (referred to as an air-to-water heating mode) and a middle-temperature water production mode. FIG. 12 is a view illustrating a combined heating mode, in which the air-to-air heating mode and the air-to-water heating mode are simultaneously performed, and the high-temperature water production mode. FIG. 13 is a view illustrating a combined heating mode in which the air-to-air heating mode and the air-to-water heating mode are simultaneously performed, and the middle-temperature water production mode.

Air-to-Air Heating Mode

In the air-to-air heating mode illustrated in FIG. 9, the controller 202 of the heat pump apparatus 100 controls the first flow path switching valve 112a to form the flow path a1-a2 such that the heat pump apparatus 100 may be operated in the heating mode. The controller 202 controls the second flow path switching valve 112b to form the flow path b1-b3 such that the first refrigerant of high temperature and high pressure discharged from the first compressor 108 flows to the indoor unit 104. The controller 202 controls the third flow path switching valve 112c to form the flow path c1-c3 to allow circulation of the first refrigerant between the outdoor unit 102 and the indoor unit 104. The third expansion valve 124a and the fourth expansion valve 124b of the hydro unit 106 are closed such that the refrigerant having passed through the indoor unit 104 does not flow to the hydro unit 106. Thereby, the first refrigerant of high temperature and high pressure discharged from the first compressor 108 flows only to the indoor unit 104, and thus air-to-air heating through the indoor unit 104 may be independently performed.

As illustrated in FIG. 9, the air-to-air heating mode may be independently performed, irrespective of the heat recovery cooling/heating modes.

Air-to-Water Heating Mode, High-Temperature Water Production Mode

In the air-to-water heating mode and high-temperature water production mode illustrated in FIG. 10, the controller 202 of the heat pump apparatus 100 controls the first flow path switching valve 112a to form the flow path a1-a2 such that the heat pump apparatus 100 may be operated in the heating mode. The controller 202 controls the second flow path switching valve 112b to form the flow path b1-b2 such that the first refrigerant of high temperature and high pressure discharged from the first compressor 108 does not flow to the indoor unit 104. The controller 202 controls the third flow path switching valve 112c to form the flow path c1-c2 such that the first refrigerant of high temperature and high pressure discharged from the first compressor 108 flows to the hydro unit 106. Thereby, the first refrigerant of high temperature and high pressure discharged from the first compressor 108 flows only to the hydro unit 106, and thus air-to-air heating through the hydro unit 106 may be independently performed.

The controller 202 controls the fourth flow path switching valve 112d to form the flow path d1 such that the first refrigerant of high temperature and high pressure discharged from the first compressor 108 may be condensed in the third heat exchanger 122a. Heat produced as the first refrigerant may be condensed in the third heat exchanger 122a may be used to evaporate the second refrigerant discharged from the second compressor 109 and condensed in the fifth heat exchanger 122c. The controller 202 controls the fifth flow path switching valve 112e to form the flow path e2 such that water may flow to the fifth heat exchanger 122c and absorb heat produced as the second refrigerant may be condensed in the fifth heat exchanger 122c. By forming a circulation cycle of the second refrigerant in the hydro unit 106, separately from the first refrigerant, and causing heat exchange to occur between the first refrigerant and the second refrigerant in the third heat exchanger 122a as above, water temperature may be increased to a high temperature, for example, over 50° C.

The third expansion valve 124a may be open to allow the first refrigerant having passed through the third heat exchanger 122a to flow to the first heat exchanger 114 or the second heat exchanger 118, while the fourth expansion valve 124b may be closed to prevent the first refrigerant having passed through the third heat exchanger 122a from flowing to the fourth heat exchanger 122b.

As illustrated in FIG. 10, the air-to-water heating mode may be independently performed, irrespective of the heat recovery cooling/heating modes.

In the air-to-water heating mode, the indoor unit 104 may be not used since heating may be performed using the hydro unit 106. In FIG. 10, the second flow path switching valve 112b does not form the flow path b1-b3. As a result, the first refrigerant discharged from the first compressor 108 does not flow to the indoor unit 104. If the first refrigerant is introduced into the indoor unit 104, the amount of the refrigerant used in air-to-water heating may be decreased by the amount of the refrigerant introduced into the indoor unit 104, and thereby air-to-water heating efficiency may be lowered. Even in a case that only the air-to-water heating mode is independently performed, introduction of the refrigerant into the indoor unit 104 may be interrupted by the second flow path switching valve 112b and thus lowering of air-to-water heating efficiency may be prevented.

Air-to-water Heating Mode, Middle-Temperature Water Production Mode

As illustrated in FIG. 11, in the air-to-water heating mode and middle-temperature water production mode, the controller 202 controls the fourth flow path switching valve 112d to form the flow path d2 such that the first refrigerant of high temperature and high pressure discharged from the first compressor 108 may be condensed in the fourth heat exchanger 122b. Heat produced as the first refrigerant may be condensed in the fourth heat exchanger 122b may be used to heat water. The controller 202 controls the fifth flow path switching valve 112e to form the flow path e1 such that water flows into the fourth heat exchanger 122b and absorbs heat produced as the second refrigerant may be condensed in the fourth heat exchanger 122b. The third expansion valve 124a may be closed to prevent the first refrigerant from flowing to the third heat exchanger 122a, while the fourth expansion valve 124b may be open to allow the first refrigerant having passed through the fourth heat exchanger 122b to flow to the first heat exchanger 114 or the second heat exchanger 118.

Combined Heating Mode of Air-to-Air Heating Mode and Air-to-Water Heating Mode, High-Temperature Water Production Mode In the combined heating mode, in which the air-to-air heating mode and the air-to-water heating mode are simultaneously performed, and the high-temperature water production mode illustrated in FIG. 12, the controller 202 of the heat pump apparatus 100 controls the first flow path switching valve 112a to form the flow path a1-a2 such that the heat pump apparatus 100 may be operated in the heating mode. The controller 202 controls the second flow path switching valve 112b to form the flow path b1-b3 such that the first refrigerant of high temperature and high pressure discharged from the first compressor 108 flows to the indoor unit 104. The controller 202 controls the third flow path switching valve 112c to form the flow path c1-c2 such that the first refrigerant of high temperature and high pressure discharged from the first compressor 108 flows to the hydro unit 106 as well. Thereby, the first refrigerant of high temperature and high pressure discharged from the first compressor 108 may be supplied both to the indoor unit 104 and the hydro unit 106, thereby simultaneously performing air-to-air heating through the indoor unit 104 and air-to-water heating through the hydro unit 106.

The controller 202 controls the fourth flow path switching valve 112d to form the flow path d1 such that the first refrigerant of high temperature and high pressure discharged from the first compressor 108 may be condensed in the third heat exchanger 122a. Heat produced as the first refrigerant may be condensed in the third heat exchanger 122a may be used to evaporate the second refrigerant discharged from the second compressor 109 and condensed in the fifth heat exchanger 122c. The controller 202 controls the fifth flow path switching valve 112e to form the flow path e2 such that water may flow to the fifth heat exchanger 122c and absorb heat produced as the second refrigerant may be condensed in the fifth heat exchanger 122c. By forming a circulation cycle of the second refrigerant in the hydro unit 106, separately from the first refrigerant, and causing heat exchange to occur between the first refrigerant and the second refrigerant in the third heat exchanger 122a as above, water temperature may be increased to a high temperature, for example, over 50° C. The third expansion valve 124a may be open to allow the first refrigerant having passed through the third heat exchanger 122a to flow to the first heat exchanger 114 or the second heat exchanger 118, while the fourth expansion valve 124b may be closed to prevent the first refrigerant having passed through the third heat exchanger 122a from flowing to the fourth heat exchanger 122b.

As illustrated in FIG. 12, the combined heating mode of the air-to-air heating mode and the air-to-water heating mode may be independently performed, irrespective of the heat recovery cooling/heating modes. According to an exemplary case, degrees of opening of the first expansion valve 116 provided in the outdoor unit 102 and the second expansion valve 120 provided in the indoor unit 104 may be adjusted to control the flow rates of the refrigerant introduced into the outdoor unit 102 and the indoor unit 104. Thereby, the air-to-water heating capacity and the air-to-air heating capacity may be freely combined to produce a desired capacity without loss within a range equivalent to 100% the capacity of the outdoor unit 102. If the sum of the air-to-water heating capacity and the air-to-air heating capacity exceeds 100% the capacity of the outdoor unit 102, the controller 202 controls all flow paths of the third flow path switching valve 112c to be closed while controlling the second flow path switching valve 112b to form the flow path b1-b3, such that the supply of the refrigerant to the hydro unit 106 may be interrupted, and thereby air-to-air heating may be performed first. When the air-to-air heating reaches a predetermined level, the controller 202 controls all flow paths of the second flow path switching valve 112b to be closed and controls the third flow path switching valve 112c to form the flow path c1-c2, thereby performing air-to-water heating.

Combined Heating Mode of Air-to-Air Heating Mode and Air-to-Water Heating Mode, Middle-Temperature Water Production Mode As illustrated in FIG. 13, in the air-to-water heating mode and middle-temperature water production mode, the controller 202 controls the fourth flow path switching valve 112d to form the flow path d2 such that the first refrigerant of high temperature and high pressure discharged from the first compressor 108 may be condensed in the fourth heat exchanger 122b. Heat produced as the first refrigerant may be condensed in the fourth heat exchanger 122b may be used to heat water. The controller 202 controls the fifth flow path switching valve 112e to form the flow path e1 such that water flows into the fourth heat exchanger 122b and absorbs heat produced as the second refrigerant may be condensed in the fourth heat exchanger 122b. The third expansion valve 124a may be closed to prevent the first refrigerant from flowing to the third heat exchanger 122a, while the fourth expansion valve 124b may be open to allow the first refrigerant having passed through the fourth heat exchanger 122b to flow to the first heat exchanger 114 or the second heat exchanger 118.

Figure 14:
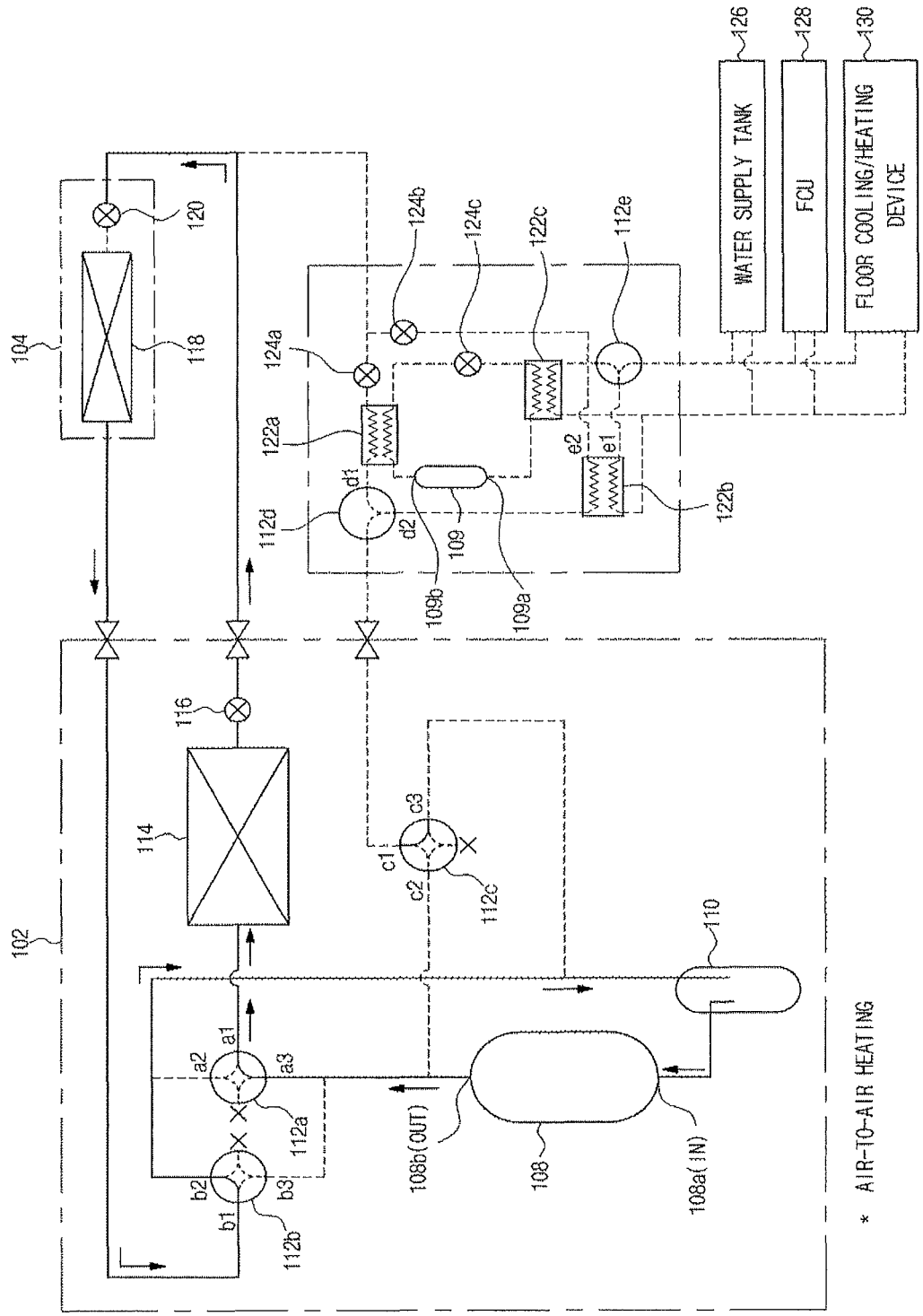
FIG. 14 is a view illustrating an exemplary cooling mode to cool air in an air conditioning space through the indoor unit to lower temperature in the air conditioning space (referred to as an air-to-air cooling mode)
Figure 15:
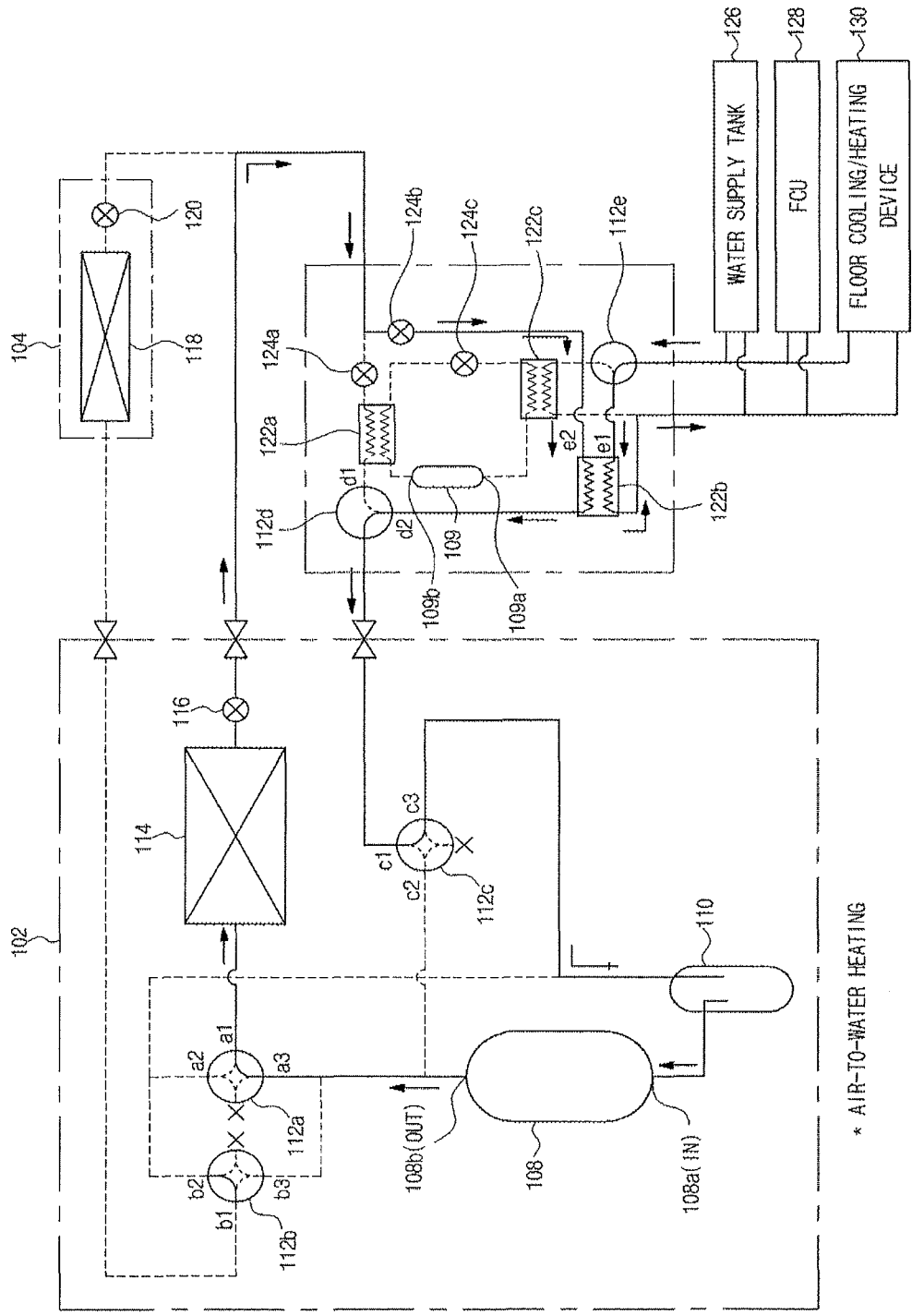
FIG. 15 is a view illustrating an exemplary cooling mode to perform cooling operation using cooled water in the hydro unit 106 (referred to as an air-to-water cooling mode) and a low-temperature water production mode.
Figure 16:
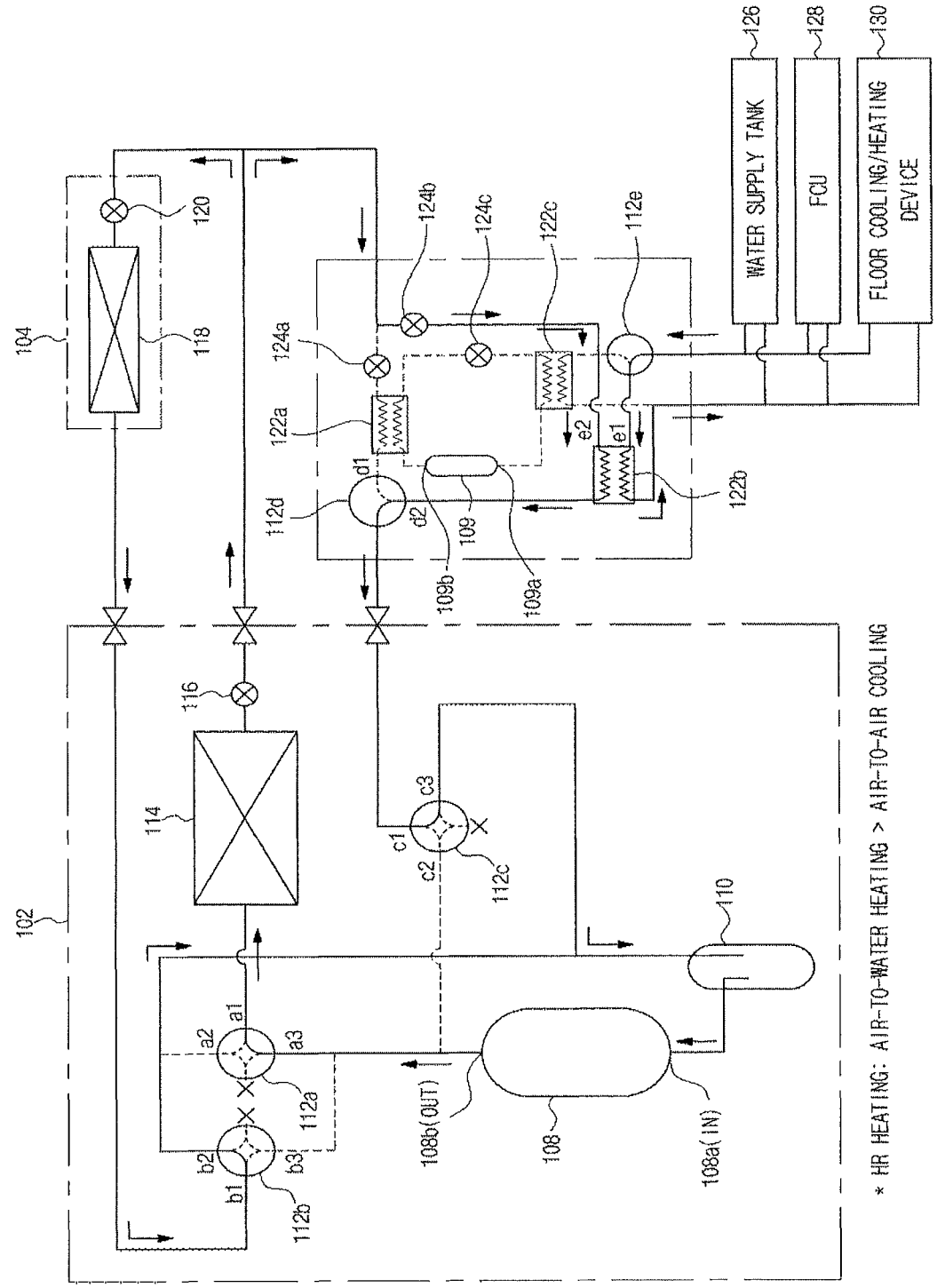
FIG. 16 is a view illustrating an exemplary combined cooling mode in which the air-to-air cooling mode and the air-to-water cooling mode are simultaneously performed, and a low-temperature water production mode.

FIGS. 14 to 16 are views illustrating cooling modes of the heat pump according to an exemplary embodiment. FIG. 14 is a view illustrating a cooling mode to cool air in an air conditioning space through the indoor unit to lower temperature in the air conditioning space (referred to as an air-to-air cooling mode). FIG. 15 is a view illustrating a cooling mode to perform cooling operation using cooled water in the hydro unit 106 (referred to as an air-to-water cooling mode) and a low-temperature water production mode. FIG. 16 is a view illustrating a combined cooling mode in which the air-to-air cooling mode and the air-to-water cooling mode are simultaneously performed, and a low-temperature water production mode.

Air-to-Air Cooling Mode

In the air-to-air cooling mode illustrated in FIG. 14, the controller 202 of the heat pump apparatus 100 controls the first flow path switching valve 112a to form the flow path a1-a3 such that the heat pump apparatus 100 may be operated in the cooling mode. The controller 202 controls the second flow path switching valve 112b to form the flow path b1-b2 such that the first refrigerant of high temperature and high pressure discharged from the first compressor 108 does not flow to the indoor unit 104. The controller 202 controls the third flow path switching valve 112c to form the flow path c1-c3 such that the first refrigerant of high temperature and high pressure discharged from the first compressor 108 does not flow to the hydro unit 106. The third expansion valve 124a and the fourth expansion valve 124b of the hydro unit 106 are completely closed such that the first refrigerant discharged from the compressor 108 and condensed via the first heat exchanger 114 may be supplied only to the indoor unit 104, and thereby air-to-air cooling through the indoor unit 104 may be independently performed.

As illustrated in FIG. 14, the air-to-air cooling mode may be independently performed irrespective of the heat recovery cooling/heating modes.

Air-to-Water Cooling Mode, Low-Temperature Water Production Mode

In the air-to-water cooling mode illustrated in FIG. 15, the controller 202 of the heat pump apparatus 100 controls the first flow path switching valve 112a to form the flow path a1-a3 such that the heat pump apparatus 100 may be operated in the cooling mode. The controller 202 controls the second flow path switching valve 112b to form the flow path b1-b2 such that the first refrigerant of high temperature and high pressure discharged from the first compressor 108 does not flow to the indoor unit 104. The controller 202 controls the third flow path switching valve 112c to form the flow path c1-c3 such that the first refrigerant of high temperature and high pressure discharged from the first compressor 108 does not flow to the hydro unit 106. The second expansion valve 120 of the indoor unit 104 may be completely closed such that the refrigerant discharged from the compressor 108 and condensed via the first heat exchanger 114 may be supplied only to the hydro unit 106, and thereby air-to-air cooling through the hydro unit 106 may be independently performed.

The controller 202 controls the fourth flow path switching valve 112d to form the flow path d2 such that the first refrigerant evaporated in the fourth heat exchanger 122b flows to the inlet port 108a of the first compressor 108. When the first refrigerant evaporates in the fourth heat exchanger 122b, the first refrigerant absorbs heat from water introduced into the fourth heat exchanger 122b. The controller 202 controls the fifth flow path switching valve 112e to form the flow path e1 such that water flows to the fourth heat exchanger 122b and loses heat when the first refrigerant evaporates in the fourth heat exchanger 122b. The third expansion valve 124a may be closed to prevent the first refrigerant from flowing to the third heat exchanger 122a, while the fourth expansion valve 124b may be open to allow the first refrigerant compressed in the first heat exchanger 114 or the second heat exchanger 118 to flow to the fourth heat exchanger 122b.

As illustrated in FIG. 15, the air-to-water cooling mode may be independently performed irrespective of the heat recovery cooling/heating modes.

Combined Cooling Mode of Air-to-Air Cooling Mode and Air-to-Water Cooling Mode

In the combined cooling mode, in which the air-to-air cooling mode and the air-to-water cooling mode are simultaneously performed, illustrated in FIG. 16, the controller 202 of the heat pump apparatus 100 controls the first flow path switching valve 112a to form the flow path a1-a3 such that the heat pump apparatus 100 may be operated in the cooling mode. The controller 202 controls the second flow path switching valve 112b to form the flow path b1-b2 such that the first refrigerant of high temperature and high pressure discharged from the first compressor 108 does not flow to the indoor unit 104. The controller 202 controls the third flow path switching valve 112c to form the flow path c1-c3 such that the first refrigerant discharged from the first compressor 108 and condensed via the first heat exchanger 114 flows to the hydro unit 106 as well. Thereby, the first refrigerant of high temperature and high pressure discharged from the first compressor 108 may be supplied both to the indoor unit 104 and the hydro unit 106, thereby simultaneously performing air-to-air cooling through the indoor unit 104 and air-to-water cooling through the hydro unit 106.

The controller 202 controls the fourth flow path switching valve 112d to form the flow path d2 such that the first refrigerant evaporated in the fourth heat exchanger 122b flows to the inlet port 108a of the first compressor 108. When the first refrigerant evaporates in the fourth heat exchanger 122b, the first refrigerant absorbs heat from water introduced into the fourth heat exchanger 122b. The controller 202 controls the fifth flow path switching valve 112e to form the flow path e1 such that water flows to the fourth heat exchanger 122b and loses heat when the first refrigerant evaporates in the fourth heat exchanger 122b. The third expansion valve 124a may be closed to prevent the first refrigerant from flowing to the third heat exchanger 122a, while the fourth expansion valve 124b may be open to allow the first refrigerant compressed in the first heat exchanger 114 or the second heat exchanger 118 to flow to the fourth heat exchanger 122b.

As illustrated in FIG. 16, the combined cooling mode of the air-to-air cooling mode and the air-to-water cooling mode may be performed irrespective of the heat recovery cooling/heating modes.

According to an exemplary embodiment of the present invention, a hydro unit may be allowed to independently perform compression, condensation and evaporation of a refrigerant, and therefore the water temperature may be increased to a high temperature, for example, over 50° C.

By performing switching between the high-temperature water production mode, middle-temperature water production mode, and low-temperature water production mode, water of different temperatures may be supplied.

Although a few embodiments of the present invention have been shown and described, it would be appreciated by those skilled in the art that changes may be made in these embodiments without departing from the principles and spirit of the invention, the scope of which may be defined in the claims and their equivalents.

What is claimed is:

1. A heat pump apparatus comprising:
an outdoor unit comprising a first compressor to compress a first refrigerant, a first heat exchanger to cause a heat exchange to occur between the first refrigerant and outdoor air, and a first expansion valve to expand the first refrigerant and having one side connected to the first heat exchanger;
an indoor unit connectable to the outdoor unit via at least a first refrigerant pipe and to an other side of the first expansion valve of the outdoor unit via at least a second refrigerant pipe and comprising a second heat exchanger to cause a heat exchange to occur between the first refrigerant and indoor air, and a second expansion valve to expand the first refrigerant and to control flow rates of the refrigerant introduced into the outdoor unit and the indoor unit;
a hydro unit connectable to the outdoor unit via at least a third refrigerant pipe and to the second expansion valve of the indoor unit via at least a fourth refrigerant pipe and comprising a second compressor to compress a second refrigerant, a third heat exchanger to cause a heat exchange to occur between the first refrigerant and the second refrigerant, a fourth heat exchanger to cause a heat exchange to occur between the first refrigerant and water, a fifth heat exchanger to cause heat exchange to occur between the second refrigerant and water, a third expansion valve arranged to allow the first refrigerant to flow to the first or the second heat exchanger when open or to prevent the first refrigerant from flowing to the third heat exchanger when closed, and a fourth expansion valve to expand the first refrigerant, and a fifth expansion valve to expand the second refrigerant;
a refrigerant flow path switching unit to switch among flow paths of the first refrigerant between the first compressor of the outdoor unit and the first heat exchanger of the outdoor unit, between the first compressor of the outdoor unit and the second heat exchanger of the indoor unit, between the first compressor of the outdoor unit and the third heat exchanger of the hydro unit, and between the first compressor of the outdoor unit and the fourth heat exchanger of the hydro unit; and
a water flow path switching unit to switch between flow paths of the water to allow the water to flow to one of the fourth heat exchanger of the hydro unit and the fifth heat exchanger of the hydro unit,
wherein the refrigerant flow path switching unit comprises a fourth flow path switching valve to allow the first refrigerant to flow to one of the fourth heat exchanger of the hydro unit and the third heat exchanger of the hydro unit.

2. The heat pump apparatus according to claim 1, wherein the water flow path switching unit is a three-way valve.

3. The heat pump apparatus according to claim 1, wherein the refrigerant flow path switching unit comprises:
a first flow path switching valve disposed between the first compressor of the outdoor unit and the first heat exchanger of the outdoor unit to allow the first refrigerant discharged from an outlet port of the first compressor of the outdoor unit to flow to the first heat exchanger of the outdoor unit or to allow the first refrigerant having passed through the first heat exchanger of the outdoor unit to be introduced into an inlet port of the first compressor of the outdoor unit;
a second flow path switching valve disposed between the first compressor of the outdoor unit and the second heat exchanger of the indoor unit to allow the first refrigerant discharged from the outlet port of the first compressor of the outdoor unit to flow to the second heat exchanger of the indoor unit to or to allow the first refrigerant having passed through the second heat exchanger of the indoor unit to be introduced into the inlet port of the first compressor of the outdoor unit;
a third flow path switching valve disposed between the first compressor of the outdoor unit and the third heat exchanger of the hydro unit to allow the first refrigerant discharged from the outlet port of the first compressor of the outdoor unit to flow to the third heat exchanger of the hydro unit or to allow the first refrigerant having passed through the third heat exchanger of the hydro unit to be introduced into the inlet port of the first compressor of the outdoor unit; and
the fourth flow path switching valve to allow the first refrigerant having passed through the third flow path switching valve to flow to one of the fourth heat exchanger of the hydro unit and the third heat exchanger of the hydro unit.

4. The heat pump apparatus according to claim 3, wherein, in a high-temperature water production mode,
the fourth flow path switching valve performs flow path switching to allow the first refrigerant to flow to the third heat exchanger of the hydro unit,
the water flow path switching unit performs flow path switching to allow the water to flow to the fifth heat exchanger of the hydro unit, and
the second refrigerant compressed in the second compressor is condensed in the fifth heat exchanger of the hydro unit to exchange heat with the water, and evaporates in the third heat exchanger of the hydro unit to exchange heat with the first refrigerant.

5. The heat pump apparatus according to claim 4, wherein:
the third expansion valve of the hydro unit is open to allow the first refrigerant having passed through the third heat exchanger of the hydro unit to flow to the first heat exchanger of the outdoor unit or the second heat exchanger of the indoor unit; and
the fourth expansion valve is closed to prevent the first refrigerant having passed through the third heat exchanger of the hydro unit from flowing to the fourth heat exchanger of the hydro unit.

6. The heat pump apparatus according to claim 3, wherein, in a middle-temperature water production mode,
the fourth flow path switching valve performs flow path switching to allow the first refrigerant to flow to the fourth heat exchanger of the hydro unit, and
the water flow path switching unit performs flow path switching to allow the water to flow to the fourth heat exchanger of the hydro unit.

7. The heat pump apparatus according to claim 6, wherein:
the third expansion valve of the hydro unit is closed to prevent the first refrigerant from flowing to the third heat exchanger; and
the fourth expansion valve is open to allow the first refrigerant having passed through the fourth heat exchanger of the hydro unit to flow to the first heat exchanger of the outdoor unit or the second heat exchanger of the indoor unit.

8. The heat pump apparatus according to claim 3, wherein, in a low-temperature water production mode,
the fourth flow path switching valve performs flow path switching to allow the first refrigerant evaporated in the fourth heat exchanger to flow to the inlet port of the first compressor, and
the water flow path switching unit performs flow path switching to allow the water to flow to the fourth heat exchanger of the hydro unit.

9. The heat pump apparatus according to claim 8, wherein:
the third expansion valve of the hydro unit is closed to prevent the first refrigerant from flowing to the third heat exchanger; and
the fourth expansion valve is open to allow the first refrigerant compressed in the first compressor to flow to the fourth heat exchanger of the hydro unit.

10. The heat pump apparatus according to claim 1, further comprising a controller configured to control at least one operation of the heat pump apparatus based on signals received from a sensor and a remote control.

11. The heat pump apparatus according to claim 1, wherein a circulation cycle of the second refrigerant in the hydro unit is separate from a circulation cycle of the first refrigerant except for the heat exchange between the first refrigerant and the second refrigerant through the third heat exchanger of the hydro unit.

12. A heat pump apparatus comprising:
a first compressor of an outdoor unit to compress a first refrigerant;
a second compressor of a hydro unit to compress a second refrigerant;
a first heat exchanger of the outdoor unit to cause heat exchange to occur between the first refrigerant and outdoor air;
a plurality of refrigerant pipes to connect parts of the heat pump apparatus, wherein at least a first of the plurality of refrigerant pipes to connect the outdoor unit with an indoor unit, and at least a third of the plurality of refrigerant pipes to connect the hydro unit and the outdoor unit;
a first expansion valve of the outdoor unit to expand the first refrigerant and having one side of the first expansion valve connected to the first heat exchanger and an other side of the first expansion valve connectable via at least a second of the plurality of refrigerant pipes to the indoor unit;
a second heat exchanger of the indoor unit to cause heat exchange to occur between the first refrigerant and indoor air;
a third heat exchanger of a hydro unit to cause heat exchange to occur between the first refrigerant and the second refrigerant;
a second expansion valve of the indoor unit to expand the first refrigerant and connectable via at least a fourth of the plurality of refrigerant pipes to the hydro unit;
a third expansion valve arranged to allow the first refrigerant to flow to the first or the second heat exchanger when open or to prevent the first refrigerant from flowing to the third heat exchanger when closed;
a fourth heat exchanger of the hydro unit to cause heat exchange to occur between the first refrigerant and water;
a fifth heat exchanger of the hydro unit to cause heat exchange to occur between the second refrigerant and water;
a first flow path switching valve disposed between the first compressor of the outdoor unit and the first heat exchanger of the outdoor unit to allow the first refrigerant discharged from an outlet port of the first compressor of the outdoor unit to flow to the first heat exchanger of the outdoor unit or to allow the first refrigerant having passed through the first heat exchanger of the outdoor unit to be introduced into an inlet port of the first compressor of the outdoor unit;
a second flow path switching valve disposed between the first compressor and the second heat exchanger of the indoor unit to allow the first refrigerant discharged from the outlet port of the first compressor to flow to the second heat exchanger of the indoor unit or to allow the first refrigerant having passed through the second heat exchanger of the indoor unit to be introduced into the inlet port of the first compressor of the outdoor unit;
a third flow path switching valve disposed between the first compressor of the outdoor unit and the third heat exchanger of the hydro unit to allow the first refrigerant discharged from the outlet port of the first compressor of the outdoor unit to flow to the third heat exchanger of the hydro unit or to allow the first refrigerant having passed through the third heat exchanger of the hydro unit to be introduced into the inlet port of the first compressor of the outdoor unit;
a fourth flow path switching valve to allow the first refrigerant having passed through the third flow path switching valve to flow to one of the fourth heat exchanger of the hydro unit and the third heat exchanger of the hydro unit; and
a fifth flow path switching valve to allow the water to flow to one of the fourth heat exchanger of the hydro unit and the fifth heat exchanger of the hydro unit.

13. The heat pump apparatus according to claim 12, wherein, in a high-temperature water production mode,
the fourth flow path switching valve performs flow path switching to allow the first refrigerant to flow to the third heat exchanger of the hydro unit, and
the fifth flow path switching valve performs flow path switching to allow the water to flow to the fifth heat exchanger of the hydro unit.

14. The heat pump apparatus according to claim 13, wherein the second refrigerant compressed in the second compressor of the hydro unit is condensed in the fifth heat exchanger to exchange heat with the water, and evaporates in the third heat exchanger to exchange heat with the first refrigerant.

15. The heat pump apparatus according to claim 12, wherein, in a middle-temperature water production mode,
the fourth flow path switching valve performs flow path switching to allow the first refrigerant to flow to the fourth heat exchanger of the hydro unit, and
the fifth flow path switching valve performs flow path switching to allow the water to flow to the fourth heat exchanger of the hydro unit.

16. The heat pump apparatus according to claim 12, wherein, in a low-temperature water production mode,
the fourth flow path switching valve performs flow path switching to allow the first refrigerant evaporated in the fourth heat exchanger of the hydro unit to flow to the inlet port of the first compressor,
the fifth flow path switching valve performs flow path switching to allow the water to flow to the fourth heat exchanger of the hydro unit.

17. The heat pump apparatus according to claim 12, wherein the first flow path switching valve, the second flow path switching valve, and the third flow path switching valve are four-way valves.

18. The heat pump apparatus according to claim 12, wherein the fourth flow path switching valve and the fifth flow path switching valve are three-way valves.

19. A heat pump apparatus comprising:
an outdoor unit comprising a first compressor to compress a first refrigerant, a first heat exchanger to exchange heat between the first refrigerant and outdoor air, and a first expansion device to expand the first refrigerant and having one side connected to the first heat exchanger;
an indoor unit connectable to the outdoor unit via at least a first refrigerant pipe and to another side of the first expansion device of the outdoor unit via at least a second refrigerant pipe and comprising a second heat exchanger to exchange heat between the first refrigerant and indoor air, and a second expansion device to expand the first refrigerant;
a hydro unit connectable to the outdoor unit via at least a third refrigerant pipe and to the second expansion device of the indoor unit via at least a fourth refrigerant pipe and comprising a second compressor to compress a second refrigerant, a third heat exchanger to exchange heat between the first refrigerant and the second refrigerant, a fourth heat exchanger to exchange heat between the first refrigerant and water, a fifth heat exchanger to exchange heat between the second refrigerant and water, a third expansion device arranged to allow the first refrigerant to flow to the first or the second heat exchanger when open or to prevent the first refrigerant from flowing to the third heat exchanger when closed, and a fourth expansion device to expand the first refrigerant, and a fifth expansion device to expand the second refrigerant;
a refrigerant flow path switching unit to switch among flow paths of the first refrigerant between the first compressor of the outdoor unit and the first heat exchanger of the outdoor unit, between the first compressor of the outdoor unit and the second heat exchanger of the indoor unit, between the first compressor of the outdoor unit and the third heat exchanger of the hydro unit, and between the first compressor of the outdoor unit and the fourth heat exchanger of the hydro unit; and
a water flow path switching unit to switch between flow paths of the water to allow the water to flow to one of the heat exchangers,
wherein the refrigerant flow path switching unit comprises a fourth flow path switching valve to allow the first refrigerant to flow to one of the fourth heat exchanger of the hydro unit and the third heat exchanger of the hydro unit.

20. A method of raising water temperature, comprising:
compressing a first refrigerant with a first compressor in an outdoor unit, exchanging heat the first heat exchanger between the first refrigerant and outdoor air, and expanding the first refrigerant with a first expansion device having one side connected to the first heat exchanger;
exchanging heat between the first refrigerant and indoor air and expanding the first refrigerant with a second expansion device in the indoor unit connectable to the outdoor unit via at least the first refrigerant pipe and to another side of the first expansion device of the outdoor unit via at least a second refrigerant pipe;
compressing a second refrigerant with a second compressor in a hydro unit connectable to the outdoor unit via at least a third refrigerant pipe into the second expansion valve the indoor unit via at least a fourth refrigerant pipe, exchanging heat between the first refrigerant and the second refrigerant, exchanging heat between the first refrigerant and water, exchanging heat between the second refrigerant and water, allowing the first refrigerant to flow to the first or the second heat exchanger when open or to prevent the first refrigerant from flowing to a third heat exchanger when closed with a third expansion device in the hydro unit, and expanding the second refrigerant with a fourth expansion device in the hydro unit;
switching among flow paths of the first refrigerant between the first compressor of the outdoor unit and a first heat exchanger of the outdoor unit, between the first compressor of the outdoor unit and a second heat exchanger of the indoor unit, between the first compressor of the outdoor unit and the third heat exchanger of the hydro unit, and between the first compressor of the outdoor unit and a fourth heat exchanger of the hydro unit;
switching between flow paths of the water to allow the water to flow to one of the heat exchangers; and
switching to allow the first refrigerant to flow to one of the fourth heat exchanger of the hydro unit and the third heat exchanger of the hydro unit.

* * * * *